US012586861B2

(12) United States Patent
Jackson et al.

(10) Patent No.: US 12,586,861 B2
(45) Date of Patent: Mar. 24, 2026

(54) BREATHABLE OVERPRESSURE ASSEMBLY

(71) Applicant: Oklahoma Safety Equipment Company, Inc., Broken Arrow, OK (US)

(72) Inventors: Robert Jackson, Broken Arrow, OK (US); Jonathan Franks, Catoosa, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 828 days.

(21) Appl. No.: 17/570,001

(22) Filed: Jan. 6, 2022

(65) Prior Publication Data

US 2022/0216566 A1 Jul. 7, 2022

Related U.S. Application Data

(60) Provisional application No. 63/134,533, filed on Jan. 6, 2021.

(51) Int. Cl.
*H01M 50/342* (2021.01)
*H01M 50/367* (2021.01)

(52) U.S. Cl.
CPC ..... *H01M 50/3425* (2021.01); *H01M 50/367* (2021.01); *H01M 2200/20* (2013.01); *H01M 2220/20* (2013.01)

(58) Field of Classification Search
CPC .......... H01M 50/3425; H01M 50/367; H01M 2200/20; H01M 2220/20; B01D 3/14; B01J 19/00; B01J 19/002; B01J 2219/0027; B08B 17/06; B08B 9/02; B65D 90/22; B65D 90/36; E21B 34/063; F16K 17/14;
(Continued)

(56) References Cited

U.S. PATENT DOCUMENTS 4,342,988 A * 8/1982 Thompson et al. .... F16K 17/16
340/679
4,505,993 A 3/1985 Skinner
(Continued)

FOREIGN PATENT DOCUMENTS

WO 2020160765 A1 8/2020

OTHER PUBLICATIONS

European Patent Office, extended European search report dated Feb. 19, 2025, from related European Patent Application No. 22737103. 6, 11 pages.
International Search Report and Written Opinion for International Application No. PCT/US2022/011438, mailed Apr. 1, 2022, 21 pages.

*Primary Examiner* — Matthew T Martin
*Assistant Examiner* — Alexandra J Simmons
(74) *Attorney, Agent, or Firm* — Fitch, Even, Tabin & Flannery LLP

(57) ABSTRACT

There is provided breathable overpressure assemblies that are secured to a sealed container and configured to rupture in the event of a rapid pressure increase and to regulate pressure inside the container. A breathable overpressure assembly includes a rupture member having a central rupture portion and a peripheral flange extending about at least a portion of a periphery of the central rupture portion. The breathable overpressure assembly includes at least one vent opening in at least one of the central rupture portion and the peripheral flange, and a breathable membrane that covers the at least one vent opening.

23 Claims, 10 Drawing Sheets

(58) Field of Classification Search
CPC ................. F16K 17/16; F16K 17/1606; F16K
17/1613; F16K 14/40
See application file for complete search history.

(56) References Cited

U.S. PATENT DOCUMENTS

| | | | |
|---|---|---|---|
| 4,612,739 A * | 9/1986 | Wilson ................. | F16K 17/162 |
| | | | 52/1 |
| 6,607,003 B1 | 8/2003 | Wilson | |
| 8,322,360 B2 | 12/2012 | Wilson | |
| 8,333,212 B2 | 12/2012 | Shaw et al. | |
| 8,622,071 B2 | 1/2014 | Wilson | |
| 8,733,383 B1 | 5/2014 | Wilson | |
| 8,807,154 B2 | 8/2014 | Khamitkar | |
| 9,373,870 B2 | 6/2016 | Duncan et al. | |
| 9,677,391 B2 | 6/2017 | Banks et al. | |
| 9,903,491 B2 | 2/2018 | Karppa et al. | |
| 10,228,069 B2 | 3/2019 | Wilson et al. | |
| 2004/0028995 A1* | 2/2004 | Shelekhin et al. .. | H01M 50/103 |
| | | | 429/56 |
| 2008/0166626 A1* | 7/2008 | Yoppolo ............. | H01M 50/167 |
| | | | 429/56 |
| 2012/0000548 A1* | 1/2012 | Khamitkar ......... | F16K 17/1606 |
| | | | 137/68.25 |
| 2012/0021261 A1 | 1/2012 | Kim | |
| 2013/0032219 A1 | 2/2013 | Heim et al. | |
| 2017/0307095 A1 | 10/2017 | Wilson et al. | |
| 2020/0009666 A1 | 1/2020 | Krebill et al. | |
| 2020/0365858 A1 | 11/2020 | Jaspers et al. | |

* cited by examiner

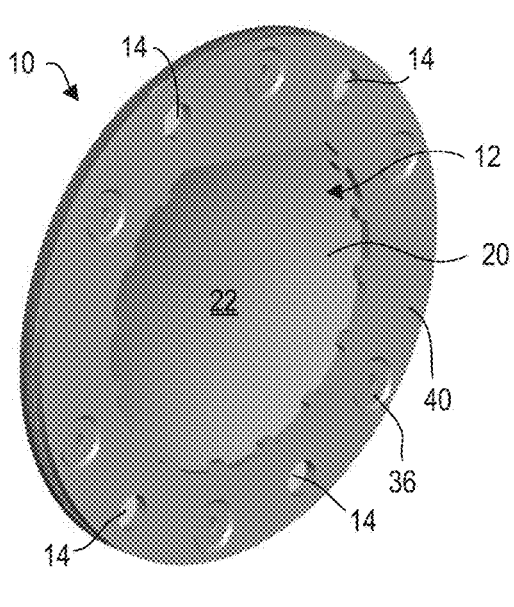
FIG. 1
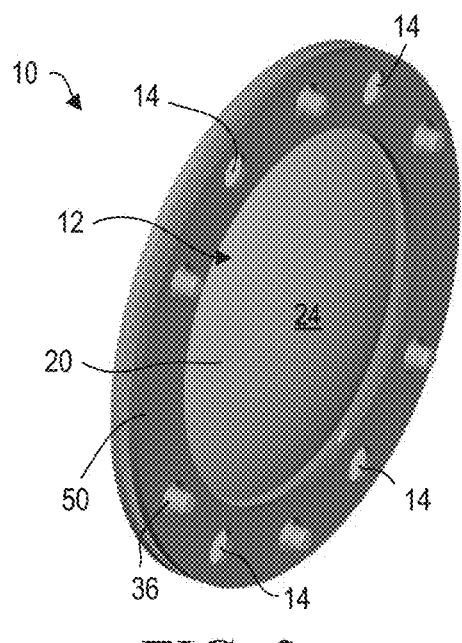
FIG. 2
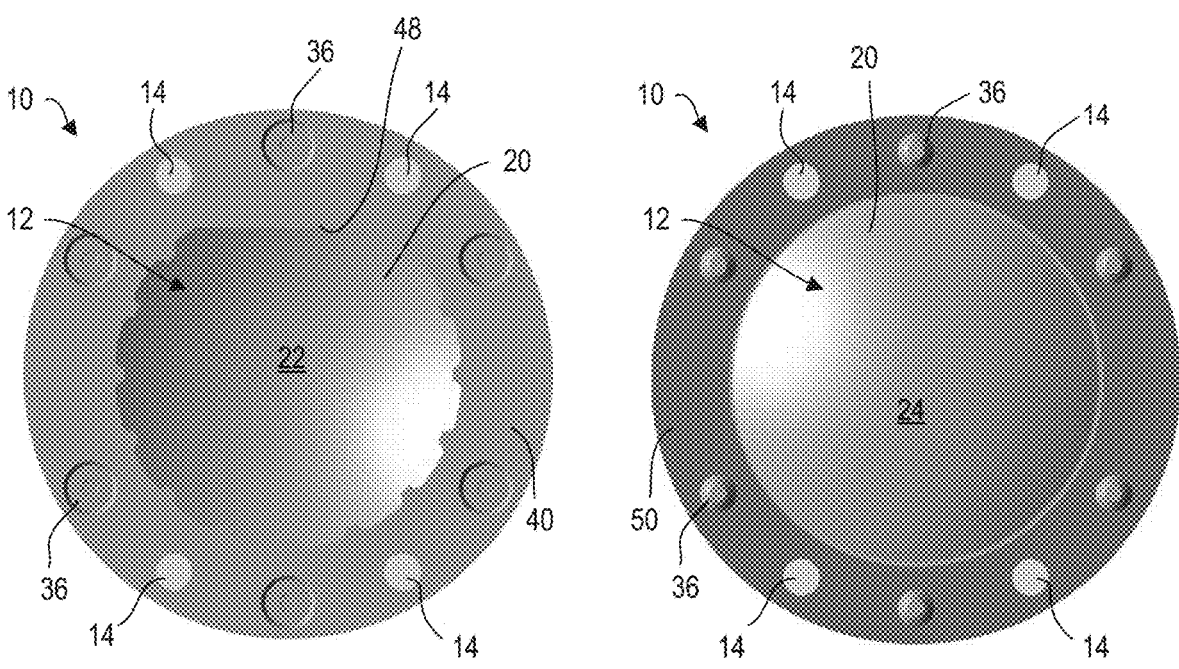
FIG. 3                    FIG. 4

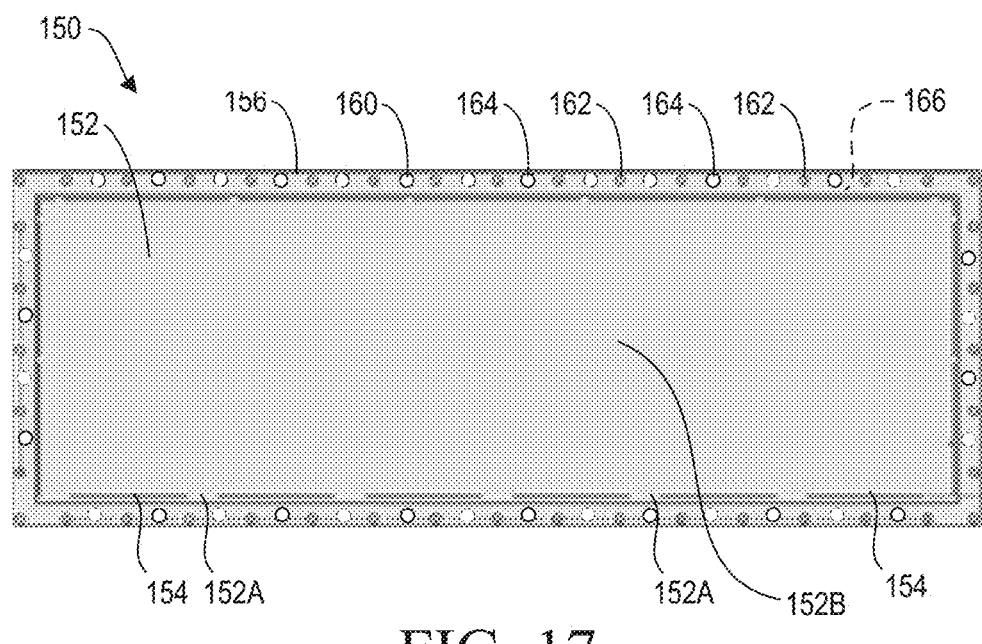
FIG. 17
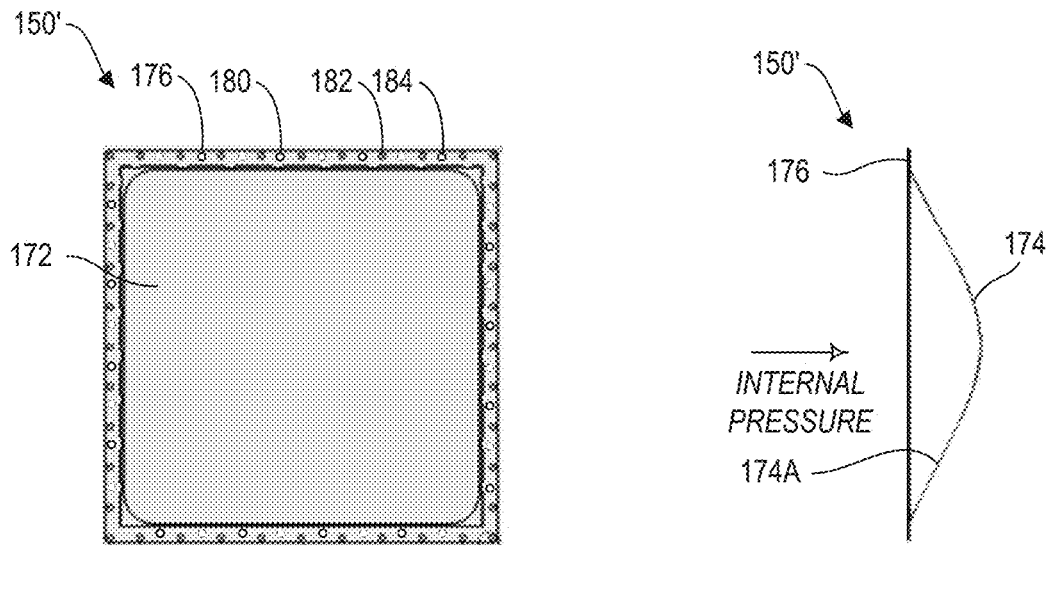
FIG. 18                    FIG. 19

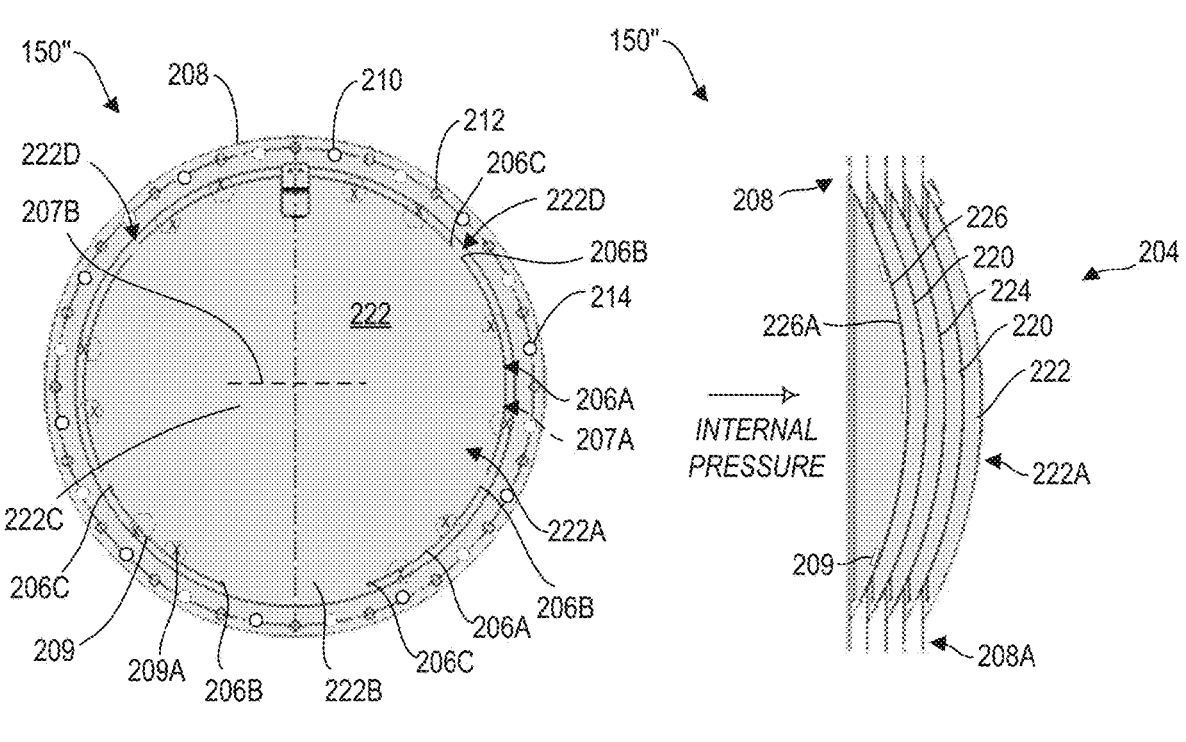
FIG. 20
FIG. 21
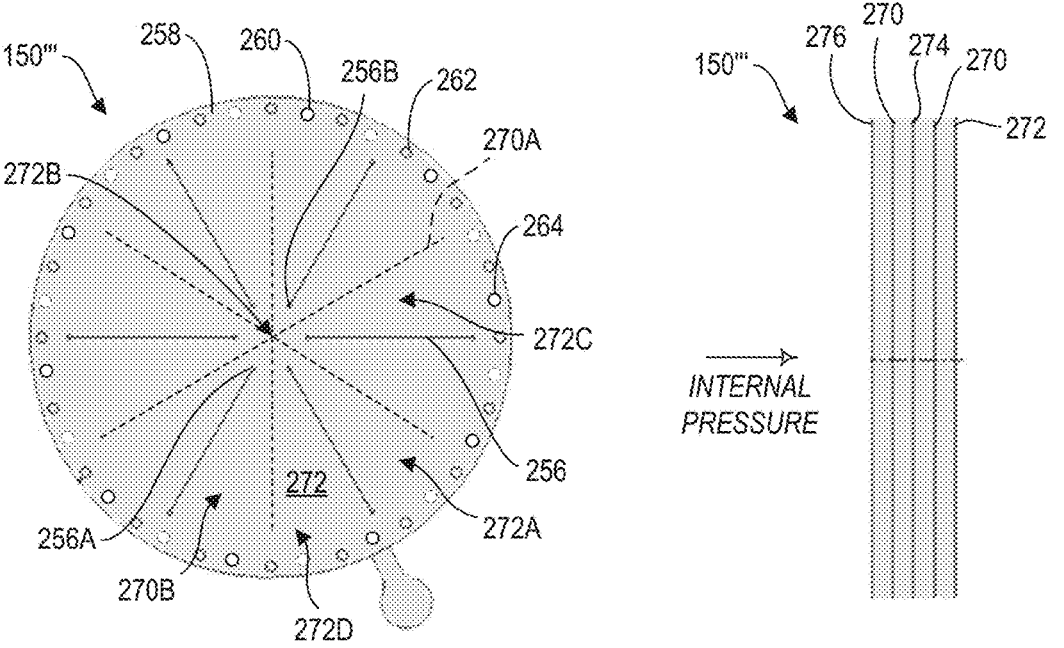
FIG. 22
FIG. 23

BREATHABLE OVERPRESSURE ASSEMBLY

CROSS-REFERENCE TO RELATED APPLICATION

This application claims the benefit of U.S. Application Ser. No. 63/134,533, filed Jan. 6, 2021, which is hereby incorporated by reference herein in its entirety.

FIELD

This disclosure relates generally to overpressure assemblies and, more particularly, to overpressure assemblies for sealed enclosures.

BACKGROUND

Many systems and vessels are sealed to prevent exposure of the contents stored therein, as well as to contain the discharge of chemical reactions that occur within the vessels. Example vessels include batteries such as lithium-ion batteries, which experience exothermic discharge reactions that produce heat within the sealed enclosures of the batteries.

Systems and vessels that are sealed may be subjected to internal pressure fluctuations. For example, changes in internal or external temperatures, altitude, humidity, and atmospheric pressure can cause the internal pressure of a sealed enclosure to increase or decrease. Breathable vents may be integrated into the design of a sealed enclosure to regulate the difference in pressure inside the enclosure relative to its immediate environment, while inhibiting contaminants and moisture from entering the sealed enclosure.

In some instances, the internal pressure of a sealed system or vessel may increase or decrease significantly, and sometimes in a very rapid manner such that the breathable vents are unable to equalize the pressure within the system. Thus, many sealed systems are provided with overpressure devices such as a rupture disc or explosion relief vent or panel. Example overpressure devices are described in U.S. Pat. Nos. 8,622,071, 8,733,383, 8,807,154, 9,677,391, and 10,228,069, the contents of which are incorporated by reference herein.

A rupture disc, also known as a pressure safety disc, burst disc, bursting disc, or burst diaphragm, is a non-reclosing pressure relief device that protects a sealed vessel, equipment, or piping system from over-pressurization or potentially damaging vacuum conditions. A rupture disc is a flat or shaped (e.g., domed) sheet of material and is designed to rupture at a predetermined pressure.

Rupture discs may be forward-acting (e.g., tension-loaded) or reverse-acting or reverse-buckling (e.g., compression-loaded). In forward-acting rupture discs, internal pressure loads are applied to the concave side of the rupture disc, thereby stretching the domed portion of the rupture disc until the tensile forces exceed the ultimate tensile stress of the material and the rupture disc bursts. Flat rupture discs may also be utilized as forward-acting rupture discs. In reverse-acting rupture disc, the internal pressure of the sealed enclosure pushes on the convex side of the rupture disc. When the pressure threshold is met, the dome of the rupture disc bursts.

Explosion relief vents or panels function similarly to rupture discs, and are typically used in larger sealed enclosures such as cargo containers and energy storage systems. Like rupture discs, explosion relief panels may be forward-acting (e.g., tension-loaded) or reverse-acting or reverse-buckling (e.g., compression-loaded). Explosion relief panels are often designed to achieve industry standards, such as National Fire Protection Agency (NFPA) 68, NFPA 885, and the ATEX directives.

In many sealed devices and systems, vents and rupture discs are externally-facing components that are exposed to ambient conditions. Many such devices and systems in which both vents and rupture discs are incorporated, such as batteries and similar devices and systems, include various internal components within a housing such as cathodes, anodes, electrolytes, separators, internal cells (e.g., cases or pouches), and associated wiring. Devices such as batteries often also include externally-facing components secured to the housing such as terminals (e.g., positive and negative terminals), dedicated vents or valves, and dedicated pressure relief devices. Due at least in part to these internal and externally-facing components, such devices and systems often have limited available packaging space or "footprint" for externally-facing components.

BRIEF DESCRIPTION OF THE DRAWINGS

FIG. 1 is a front perspective view of a breathable overpressure assembly showing a concave surface of a central rupture portion of a domed rupture disc member and vent openings having breathable membranes of the breathable overpressure assembly.

FIG. 2 is a rear perspective view of the breathable overpressure assembly showing a gasket extending about a convex surface of the central rupture portion of the domed rupture disc member, and shanks of fasteners extending through fastener openings of the breathable overpressure assembly.

FIG. 3 is a front elevation view of the breathable overpressure assembly showing breathable membranes covering vent openings of an outlet ring of the breathable overpressure assembly.

FIG. 4 is a rear elevation view of the breathable overpressure assembly showing the breathable membranes covering vent openings of a gasket of the breathable overpressure assembly.

FIG. 17 is a front elevation view of a fifth breathable overpressure assembly having a generally planar, rectangular configuration and breathable membranes covering vent openings in a peripheral flange portion extending about a flat central rupture portion of a rupture panel member.

FIG. 18 is a front elevation view of a sixth breathable overpressure assembly having breathable membranes covering vent openings in a peripheral flange portion extending about a domed central rupture portion of a rupture member.

FIG. 19 is a side elevation view of the sixth breathable overpressure assembly of FIG. 18 showing the domed central rupture portion.

FIG. 20 is a front elevation view of a seventh breathable overpressure assembly having a circular score in a central rupture portion of a rupture disc member, and breathable membranes covering vent openings in a peripheral flange portion of the rupture disc member.

FIG. 21 is a schematic exploded side elevation view of the seventh breathable overpressure assembly of FIG. 20 showing an outer domed rupture disc member, protective covers, a sealing membrane between the protective covers, and an inner metallic backing support member.

FIG. 22 is a front elevation view of an eighth breathable overpressure assembly having a radial scores in a central rupture portion, and breathable membranes covering vent openings in a peripheral flange portion.

FIG. 23 is a schematic exploded side elevation view of the eighth breathable overpressure assembly of FIG. 22 showing a generally planar outer rupture disc member, protective covers, a sealing membrane between the protective covers, and an inner metallic backing support.

DETAILED DESCRIPTION

Figure 5:
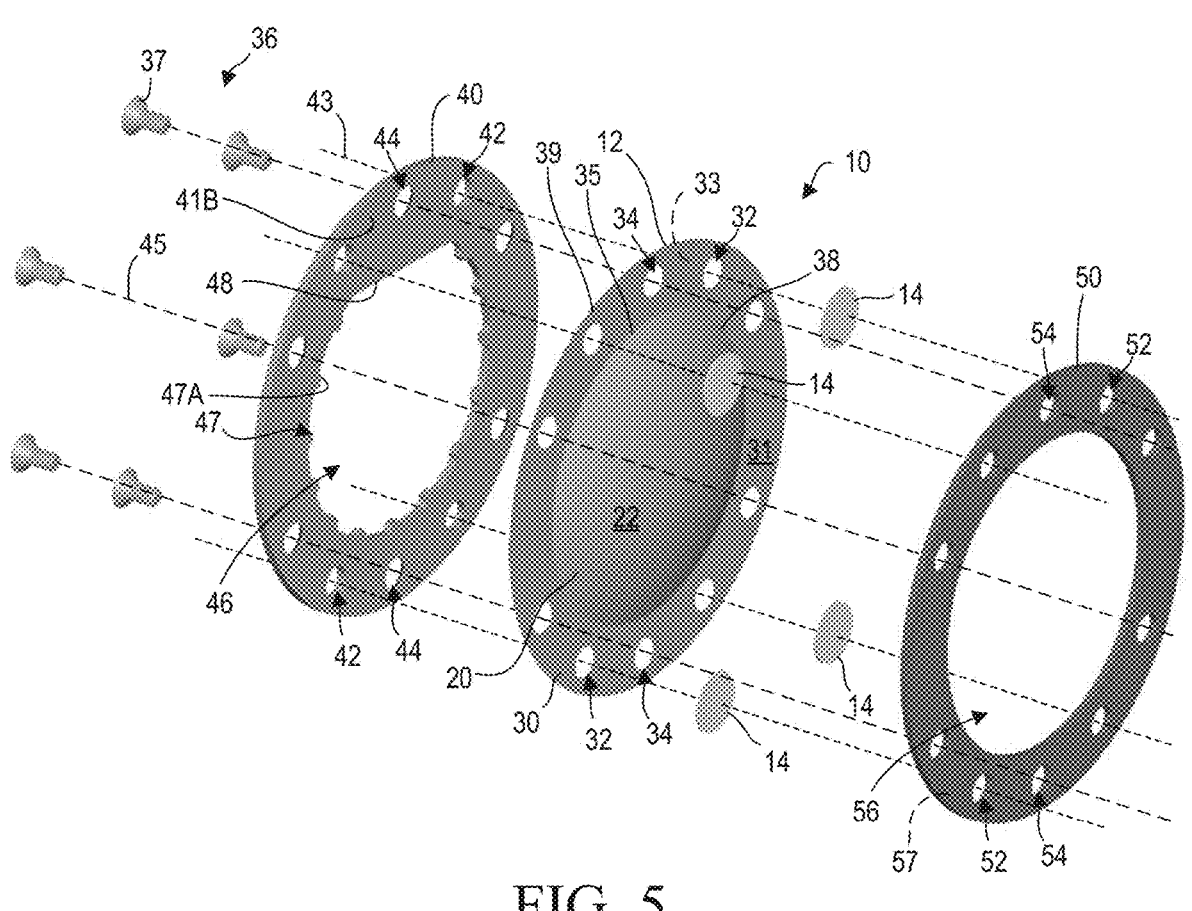
FIG. 5 is an exploded view of the breathable overpressure assembly showing the breathable membranes between the gasket and a peripheral flange of the rupture disc member.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one form, described herein is a breathable overpressure assembly or breathable rupture assembly for being mounted over an opening in a sealed container, sealed vessel, or other sealed enclosure. As used herein, a "sealed" enclosure keeps moisture, liquid, and dust or other small particles from entering an interior of the enclosure. A sealed enclosure may have an Ingress Protection (IP) rating, for example, of IP 64, IP 67, or IP 68.

The breathable overpressure assembly includes a rupture member having a central rupture portion and a peripheral flange that extends about the central rupture portion. The central rupture portion is sized to cover the opening in the sealed container and is configured to rupture at a predetermined pressure at an interior container side of the rupture member. The breathable overpressure assembly further includes at least one vent opening that extends through at least one of the central rupture portion and the peripheral flange. The breathable overpressure assembly further includes a breathable membrane that covers the vent opening for allowing the passage of gas through the at least one of the central rupture portion and the peripheral flange via the breathable membrane.

Also described herein is a breathable overpressure assembly that includes a rupture member, at least one breathable membrane, and a mounting ring. The rupture member includes a central rupture portion and a peripheral flange that extends about at least a portion of the central rupture portion. The peripheral flange includes a plurality of fastener openings and a plurality of vent openings that extend therethrough. The fastener openings and vent openings are formed in so as to alternate along the peripheral flange. The breathable membrane covers at least one vent opening of the rupture member. The mounting ring includes a plurality of fastener openings and a plurality of vent openings extending therethrough. The rupture member, breathable membrane, and mounting ring are arranged such that the plurality of fastener openings of the mounting ring are generally aligned with the plurality of fastener openings of the rupture member, and the plurality of vent openings of the mounting ring are generally aligned with the plurality of vent openings of the rupture member and the breathable membrane.

Also described herein is a sealed assembly that includes a housing and a breathable overpressure assembly secured to the housing. The breathable overpressure assembly includes a rupture member having a central rupture portion and a peripheral flange extending about at least a portion of a periphery of the central rupture portion. The peripheral flange is configured for being mounted to the housing. The peripheral flange includes at least one vent opening extending therethrough. The rupture member is configured to rupture at a predetermined rupture pressure at an interior container side of the rupture member. The breathable overpressure assembly further includes a breathable membrane that covers the vent opening. The breathable membrane is configured to regulate an internal pressure within an interior of the housing relative to an external pressure outside of the housing by allowing the passage of gas therethrough and keeping small particles outside of the housing from passing through the breathable member and entering the housing interior.

The breathable overpressure assembly is used as a pressure relief device for various vessels, conduit, and other sealed systems, and may be used in a variety of applications, such as in aerospace, agriculture, aviation, chemical, defense, food processing, medical, military, nuclear, oil field, petrochemical, pharmaceutical, and railroad applications. The breathable overpressure assembly may be used as a primary or secondary pressure relief device.

The breathable overpressure assemblies described herein may be referred to as integrated breathable overpressure assemblies in that they function to both provide constant pressure regulation (e.g., equalization) through the breathable membranes and instantaneous pressure relief (via rupture or bursting of the rupture member) in the event of sudden over- or under-pressurization. Such integrated breathable overpressure assemblies provide pressure regulation capabilities lacking in conventional rupture members, and provide instantaneous pressure relief lacking in conventional venting features.

The shape, size, quantity, and arrangement of the vent openings and breathable membranes described herein can be configured to achieve desired pressure regulations that may be necessitated, for example, due to changes in ambient or atmospheric conditions such as altitude, humidity, temperature, and atmospheric pressure.

The breathable overpressure assemblies described herein may be utilized in a variety of applications. For example, aircrafts may include sealed devices that are subject to internal pressure fluctuations during ascent and/or descent events. A battery installed in a fighter aircraft, for example, may experience a gradual internal pressure change during an ascent event, and may experience an extreme pressure change during a descent event (e.g., from approximately 50,000 feet to ground level in less than one minute). Furthermore, batteries within vehicles that operate in extreme weather conditions (e.g., temperatures ranging from approximately −40° C. to approximately 70° C.), such as many vehicles used by the military, may experience gradual or rapid internal pressure changes. As such, the breathable overpressure assemblies described herein are particularly suitable for use with batteries deployed in military aircraft and vehicles. The breathable membranes of the breathable overpressure assemblies described herein may provide constant gradual pressure regulation, while the rupture members of the breathable overpressure assemblies provide instantaneous pressure relief in the event of sudden over-pressurization.

The breathable overpressure assemblies described herein may also regulate pressure changes that occur due to chemical reactions within sealed batteries. For example, lithium-ion batteries include cells that generate heat during chemical reactions of the electrodes (e.g., cathodes and anodes) within the cells. This generation of heat increases the internal pressure of the battery. The breathable membranes of the breathable overpressure assembly permit gradual release of the internal pressure to equalize the internal and external pressures.

The breathable overpressure assemblies described herein may also account for degradation of a battery such as a lithium-ion battery. For example, when cells of a battery are exposed to excessive heat or overvoltage, a resulting pressure increase may cause off-gassing of one or more gases such as carbon monoxide, methane, ethane, ethylene, for example. The membranes of the breathable overpressure assembly permit release of such gases to deter further damage to the degrading cells. Continued exposure of the cells to excessive heat or overvoltage may result in a thermal runaway or "flameout" condition in which flammable gases may by ignited by the battery's high temperature, resulting in a fire. The rupture member of the breathable overpressure assembly is configured to rupture to permit controlled release of the ignited gases. For example, and as discussed in greater detail below, an exhaust hose may be connected to the battery at the breathable overpressure assembly over the membranes to provide controlled direction of vented and ignited gases away from the battery (e.g., to the outside atmosphere).

Referring now to FIGS. 1-5, a breathable overpressure assembly such as breathable rupture assembly 10 is shown. The breathable rupture assembly 10 includes a rupture diaphragm or disc 12 that is configured to rupture at a predetermine rupture pressure at an interior container side of the rupture disc 12. The rupture disc 12 may be formed, for example, of stainless steel, hastelloy, Inconel, nickel, graphite, or other suitable material. The breathable rupture assembly 10 also includes one or more breathable membranes 14 that are secured to the rupture disc 12, as discussed in greater detail below.

The rupture disc 12 includes a central portion 20 that is configured to rupture (e.g., within milliseconds or microseconds) due to an increase or decrease in system pressure at an interior container side of the rupture disc 12. The central portion 20 may include one or more preformed weaknesses or frangible portions, such as recesses, perforations, scores, or score lines, in a surface of the central portion 20 to form fault lines along which the central rupture portion 20 is intended to rupture or burst. For example, a cross-scored central portion (see FIG. 22) forms petals that bend outwardly upon rupture of the central portion. A central portion having a circular score 16 (see FIG. 20) extending about the central portion may form a circular tab that bends outwardly upon rupture of the central portion. The thickness and diameter of the material of the central portion 20 may be selected to achieve a desired rupture pressure threshold. A rupture pressure threshold may be, for example, approximately 4 pounds per square inch (psi), 5 psi, 15 psi, or 100 psi.

In one approach shown, the central rupture portion 20 is a central bulged or dome portion having a concave surface 22 and an opposing convex surface 24. In this way, the rupture disc 12 may be a forward-acting (tension loaded) rupture disc or a reverse-acting (compression loaded) rupture disc. More particularly, when the breathable rupture assembly 10 is secured to a sealed vessel such that the concave surface 22 of the rupture disc 12 is exposed to the internal pressure of the vessel, the rupture disc 12 is a forward-acting rupture disc. An increase in internal pressure against the concave surface 22 causes the central portion 20 to stretch until the internal pressure reaches the rupture pressure threshold, at which time the tensile forces on the central portion 20 exceed the ultimate tensile stress of the material and the rupture disc 12 bursts along the score. When breathable rupture assembly 10 is secured to a sealed vessel such that the convex surface 24 of the rupture disc 12 is exposed to the internal pressure of the vessel, the rupture disc 12 is a reverse-acting rupture disc. An increase in internal pressure against the convex surface 24 causes the central portion 20 to compress until the internal pressure reaches the rupture pressure threshold, at which time the compressive forces on the central portion 20 causes the rupture disc 12 to collapse and burst along the score. In another approach, the central portion 20 is a flat central portion, and the rupture disc 12 may be a forward-acting rupture disc.

As shown in FIG. 5, the rupture disc 12 further includes a peripheral flange portion 30 that extends about a periphery 38 of the central bulged portion 20. The peripheral flange portion 30 can be an annular flange that extends about the entire circumference of the central bulged portion 20 such that the peripheral flange portion 30 entirely surrounds the central bulged portion 20. In another approach, the peripheral flange portion 30 extends about less than the entire circumference of central bulged portion 20. In still another approach, the rupture disc 12 includes more than one annular flange that each extend about less than the entire circumference of central bulged portion 20.

The peripheral flange portion 30 includes apertures or through openings that extend through the entire thickness of the peripheral flange portion 30 to open at both flat inner and outer surfaces 31, 33 thereof. More particularly, the peripheral flange portion 30 includes one or more vent openings 32 and one or more fastener openings 34. The fastener openings 34 are sized to receive fasteners 36 therethrough, as discussed below.

The breathable membranes 14 are sized to cover the vent openings 32, and may be shaped to correspond to the shape of the breathable membranes 14. In the approach shown, the breathable membranes 14 are circular membranes, and the vent openings 32 are likewise circular openings with the breathable membranes 14 having a slightly larger diameter than the vent openings 32 so that a breathable membrane 14 can be secured over a corresponding vent opening 32 such that it entirely covers the vent opening 32. In other approaches, the breathable membranes 14 and the vent openings 32 also have the same configuration but the configuration is other than circular, such as square, oval, or bean-shaped.

The breathable rupture assembly 10 of FIGS. 1-5 includes four vent openings 32 and six fastener openings 34. The vent openings 32 include a first pair of vent openings 32 at one half of the breathable rupture assembly 10 and a second pair of vent openings 32 at the other half of the breathable rupture assembly 10. Each vent opening 32 is positioned between two fastener openings 34. The number and size of the vent openings 32 may be selected to achieve desired venting. For increased venting, a breathable rupture assembly 10 having a larger total area of vent openings 32 may be provided by increasing the number and/or size of the vent openings 32. For less venting, a breathable rupture assembly 10 having less total area of vent openings 32 may be provided by decreasing the number and/or size of the vent openings 32. In one example, the peripheral flange portion 30 may have one, two, or three vent openings that are larger than the vent openings 32 shown. In another example, the peripheral flange portion 30 may have ten or more vent openings that are smaller than the illustrated vent openings 32.

The breathable rupture assembly 10 may also include a mounting ring or outlet ring 40 that is secured to the rupture disc 12, as can be seen in FIGS. 1 and 3. For example, the outlet ring 40 may be fixedly secured to the peripheral flange portion 30 at the externally-facing (outer) surface of the rupture disc 12 via welding (e.g., spot welding) the outlet ring 40 to the peripheral flange portion 30 about the radially-outward peripheral surfaces of each of the outlet ring 40 and the peripheral flange portion 30. Additionally or alternatively, mechanical fasteners and/or adhesive may be used to be fixedly secure the outlet ring 40 to the peripheral flange portion 30. The outlet ring 40 includes vent openings 42 and fastener openings 44 that are generally aligned with vent openings 32 and fastener openings 34, respectively, of the rupture disc 12. As used herein, features (such as openings and breathable membranes) are "generally aligned" when an axis extends through the features in the airflow direction corresponding to arrow 114 of FIG. 11B. Generally aligned openings may be coaxial or may have central axes that are offset as long as portions of the openings overlap. As illustrated, the central axes 43, 45 of the vent and fastener openings 42, 44, respectively, are coaxial.

The outlet ring 40 further includes a large central opening 46. The outlet ring 40 may further include features that facilitate rupture of the central bulged portion 20. For example, the outlet ring 40 may include one or more protrusions or teeth 47 that extend radially inwardly into the large central opening 46. The radially inner ends 47A of the teeth 47 may be generally aligned with the score 16 of the central bulged portion 20, which may be arranged radially inwardly along the central bulged portion 20 from the juncture with the peripheral flange portion 30, to help propagate the rupture of the rupture disc 12 along the score 16. In another approach, the outlet ring 40 may have an inner annular edge that is aligned with the score 16. In the illustrated form, the outlet ring 40 including the teeth 47 may include a generally smooth folding edge 48 that does not include teeth 47 and that is positioned adjacent a portion of the central bulged portion 20 that is not scored. About which an unscored region of the ruptured central bulged portion 20 bends when it ruptures. Upon rupture of the rupture disc 12, one or more portions the central bulged portion 20 bend along the folding edge 48 and protrude through the central opening 46. Due at least in part to the central bulged portion 20 not being scored adjacent the folding edge 48, the central bulged portion 20 does not separate from the rest of the rupture disc 12 and is retained along the folding edge 48.

The outlet ring 40 may facilitate attachment of the breathable rupture assembly 10 to a sealed vessel such as a battery (as discussed in greater detail with respect to FIGS. 7-11B). For example, the fastener openings 44 may include frusto-conical or countersunk portions for receiving tapered head portions 37 of fasteners 36. As shown in FIG. 10B, for example, the fastener openings 44 may include a tapering wall 44A that tapers from a first diameter at an outer surface 41A of the outlet ring 40 to a second, smaller diameter at an inner surface 41B of the outlet ring 40. The tapered configuration of the fastener openings 44 receives and seats a tapered head portion 37 of a fastener 36. In this manner, the clamping forces on the peripheral flange portion 30 are directly applied by the inner flat surface 41B of the outlet ring 40 in engagement with the outer surface of the peripheral flange portion 30 to avoid having more localized clamping forces directly applied by the heads 37 of the fasteners 36.

The fastener openings 34 of the peripheral flange 30 of the rupture disc 12 may have a configuration different than the fastener openings 44 of the outlet ring 40. For example, fastener openings 34 may have diameters that are smaller than the diameter of the fastener openings 44 at the outer surface 41A of the outlet ring 40. The diameter of a fastener opening 34 may be the same as the diameter of a fastener opening 44 at the inner surface 41B of the outlet ring 40. The fastener openings 34 may be generally cylindrical.

Figure 10A:
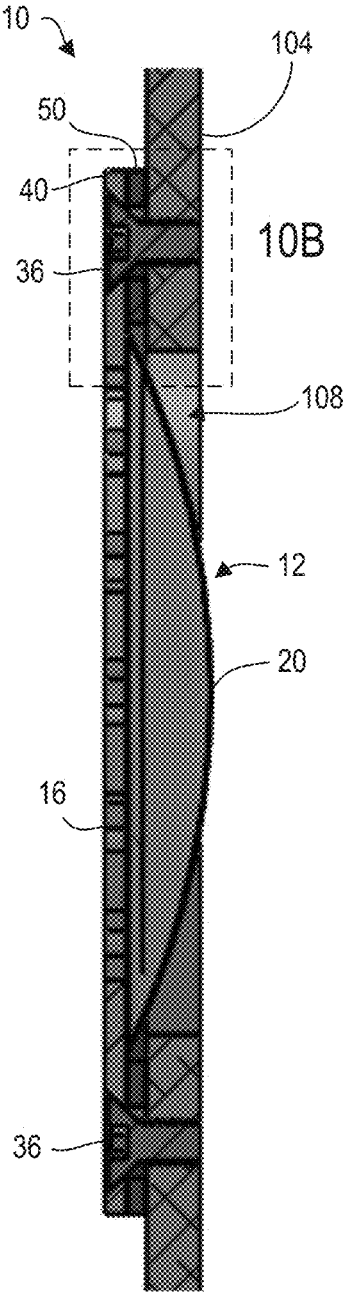
FIG. 10A is a cross-sectional view taken along line 10-10 of FIG. 9 showing the fasteners received through fastener openings of the outlet ring.
Figure 10B:
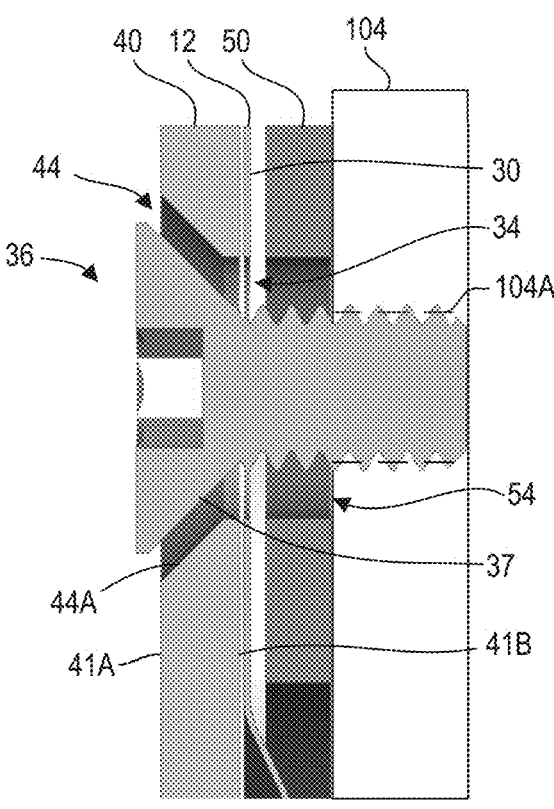
FIG. 10B is an enlarged view of the cross-section of FIG. 10A showing a conical head of a fastener received in a tapered fastener hole of the outlet ring.

The breathable rupture assembly 10 may also include an annular gasket 50 that is disposed between the peripheral flange portion 30 at the inner side of the rupture disc 12 and an external surface of a sealed vessel such as the illustrated battery case 102 (FIG. 7), discussed more fully hereinafter. The gasket 50 may be formed of a compressible, resilient material such as silicone. The gasket 50 forms a fluid-tight or substantially fluid-tight seal between the rupture disc 12 and the sealed vessel when the breathable rupture assembly 10 is installed on the sealed vessel. For example, as shown in FIGS. 10A and 10B, when the breathable rupture assembly 10 is secured to a side wall 104 of a sealed vessel, fasteners 36 acts to compress the gasket 50 between the outlet ring 40 and the side wall 104. Compression of the gasket 50 about the entire perimeter of the rupture disc 12 forms a seal with the vessel.

As also shown in FIG. 10B, threaded fastener openings 104A of the side wall 104 of the housing 102 have a diameter that is less than the diameter of the fastener openings 34, 44, and 54 of the rupture disc 12, outlet ring 40, and gasket 50, respectively, which, as discussed below, have a sufficient clearance to permit a threaded shank of a fastener 36 to pass therethrough. The threaded fastener openings 104A of the side wall 104 are dimensioned to receive the threaded shank of a fastener 36 to threadingly engage the threaded shanks of fasteners 36.

The gasket 50 includes one or more vent openings 52 and one or more fastener openings 54 that are aligned with vent openings 32 and fastener openings 34, respectively, of the rupture disc 12 and of the outlet ring 40. With reference to FIGS. 11B and 12, the vent openings 42 of the outlet ring 40, the vent openings 32 of the rupture disc 12, and the vent openings 52 of the gasket 50 may all have the same diameter. In this way, airflow through the vent openings 32, 42, 52 of passes through a constant diameter such that the airflow does not experience a change in cross-sectional area. The airflow therefore maintains a constant pressure as the airflow passes through the vent openings 32, 42, 52 of the breathable rupture assembly 10. This configuration may allow for fine tuning of venting rates through the breathable membranes 14 at the vent openings 32, 42, 52.

The gasket 50 further includes a large central opening 56 through which the central bulged portion 20 protrudes. In one approach, the gasket 50 is secured to the rupture disc 12 prior to the breathable rupture assembly 10 being installed on a sealed vessel. For example, the gasket 50 may have an adhesive (e.g., a pressure sensitive adhesive) applied at an outer rupture disc-facing surface 57 to adhere the gasket 50 to the rupture disc 12.

Figures 6A, 6B:
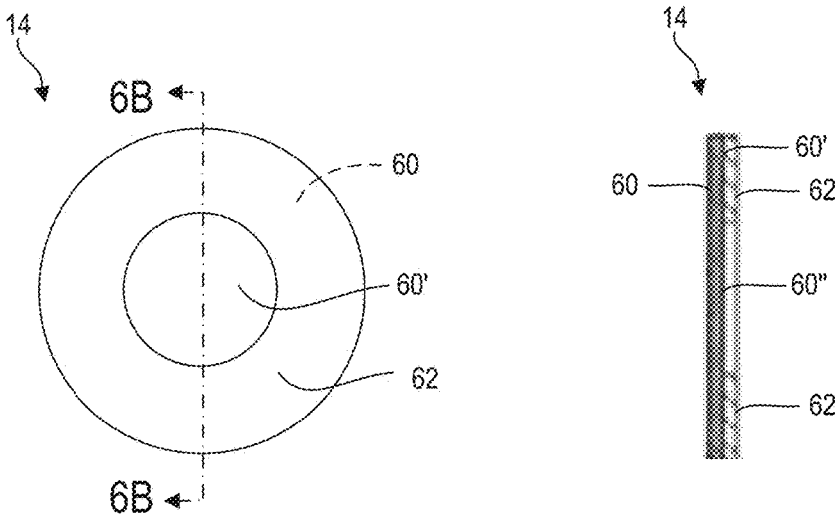
FIG. 6A is an elevation view of the breathable membrane showing an annular adhesive layer on a membrane layer.
FIG. 6B is cross-sectional view taken along line 6B-6B of FIG. 6A showing the annular adhesive layer and an exposed membrane layer portion of the membrane layer.

Referring to FIGS. 6A and 6B, the breathable membrane 14 is shown as a thin, circular membrane (although other shapes may be used). The breathable membrane 14 may include a membrane layer 60 and an adhesive layer 62 applied to the membrane layer 60 at an outer surface 60' thereof. The membrane layer 60 is formed of an air-permeable material that allows for the ingress and egress of atmospheric gases therethrough, and regulates steady state pressure within a sealed enclosure. The membrane layer 60 may be formed, for example, of polytetrafluoroethylene (PTFE), polyethylene (PE), or ultra-high-molecular-weight polyethylene (UHMWPE, UHMW). The membrane layer 60 also has an Ingress Protection (IP) rating sufficient to inhibit passage of dust particles and moisture therethrough (e.g., IP 64, IP 67, or IP 68). The breathable membrane 14 may also have corrosion resistance properties (e.g., as described in ASTM B117-11).

The adhesive layer 62 may include a pressure-sensitive adhesive. The adhesive layer 62 is applied to less than the entire surface area of the membrane layer outer surface 60' such that the membrane layer 60 includes an exposed membrane layer portion 60' that is not coated by the adhesive layer 62. For example, the adhesive layer 62 may be a ring-shaped adhesive layer 62 such that the exposed membrane layer portion 60' is an inner circular exposed portion within the ring-shaped adhesive layer 62. The ring-shaped adhesive layer 62 may have an inner diameter that is equal to or greater than a diameter of a vent opening 32 such that the exposed membrane layer portion 60' has a diameter that is also equal to or greater than the diameter of the vent opening 32. As such, the exposed membrane layer portion 60' extends across and entirely covers the vent opening 32.

In this way, the breathable membranes 14 may be secured to the rupture disc 12 such that the adhesive layers 62 adhere to an inner surface 31 of the peripheral flange portion 30 and the exposed membrane layer portions 60' are situated to extend across and cover the corresponding vent openings 32. As such, particles or moisture passing into vent openings 42 of the outlet ring 40 are inhibited from passing through the breathable membranes 14 at vent openings 32, and are thus inhibited from passing into a sealed vessel to which the breathable rupture assembly 10 is secured. The breathable membranes 14 may be dimensioned such that they do not extend beyond an inner peripheral edge 35 or outer peripheral edge 39 of the peripheral flange portion 30. For example, the diameter of the breathable membranes 14 may be less than a radial dimension of the peripheral flange portion 30.

Referring now to FIGS. 7-10, 11A, and 11B, a sealed device 100 such as a battery (e.g., a lithium-ion or lead-acid battery) may include various externally-facing components 101. The externally-facing components 101 may include, for example, the breathable rupture assembly 10, terminals (positive terminal 101A and negative terminal 101B), and other interfaces 101C. The sealed device 100 also includes various internal components such as cathodes, anodes, electrolytes, separators, internal cells, and associated wiring. Such internal components are often compactly arranged within the sealed device, and can often limit the available "footprint" of the externally-facing components 101. As described in greater detail below, the breathable rupture assembly 10 reduces the number of externally-facing components 101 by integrating a non-reclosing pressure relief device and a breathable vent, and therefore reducing the required total footprint or mounting area otherwise needed for the pressure relief device and the breathable vent on the sealed device. In certain applications, this reduction of externally-facing components 101 may simplify the arrangement of the internal components.

The breathable rupture assembly 10 may be secured to a side wall 104 of a casing or housing 102 of a sealed device 100. In the installed configuration, fasteners 36 secure the breathable rupture assembly 10 proximate an outer surface 106 of the wall 104 where an opening 108 extends through the wall 104. The concave surface 22 of the central bulged portion 20 is externally-exposed through the central opening 46 of the outlet ring 40 (FIG. 8), and the convex surface 24 protrudes into the opening 108 in the wall 104 (FIGS.

9-11B). In this orientation, the breathable rupture assembly 10 is a reverse-acting rupture disc.

Figure 11A:
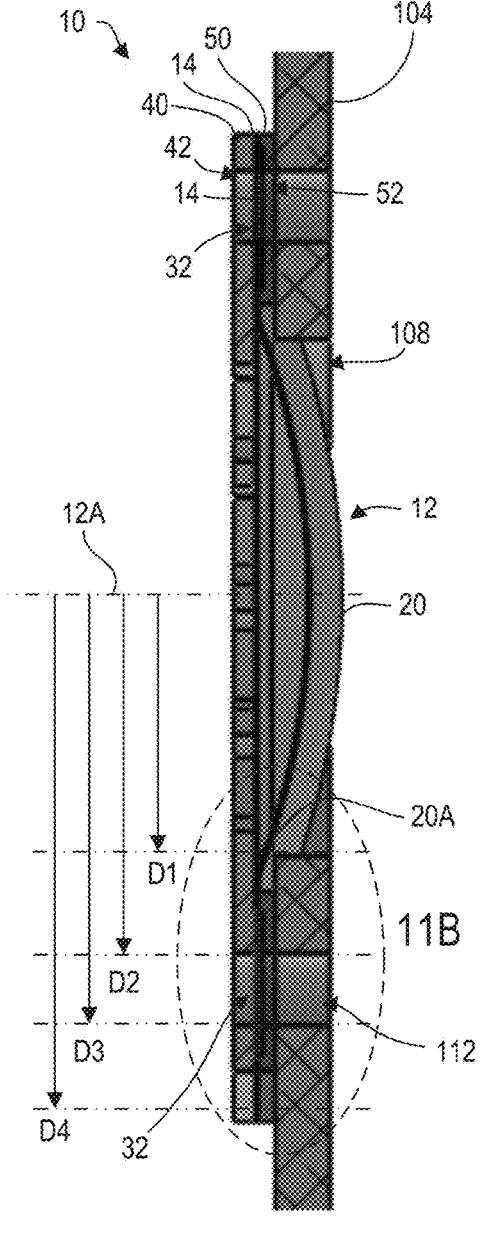
FIG. 11A is a cross-sectional view taken along line 11A-11A of FIG. 9 showing the breathable membranes aligned with vent openings of the side wall of the battery housing.
Figure 11B:
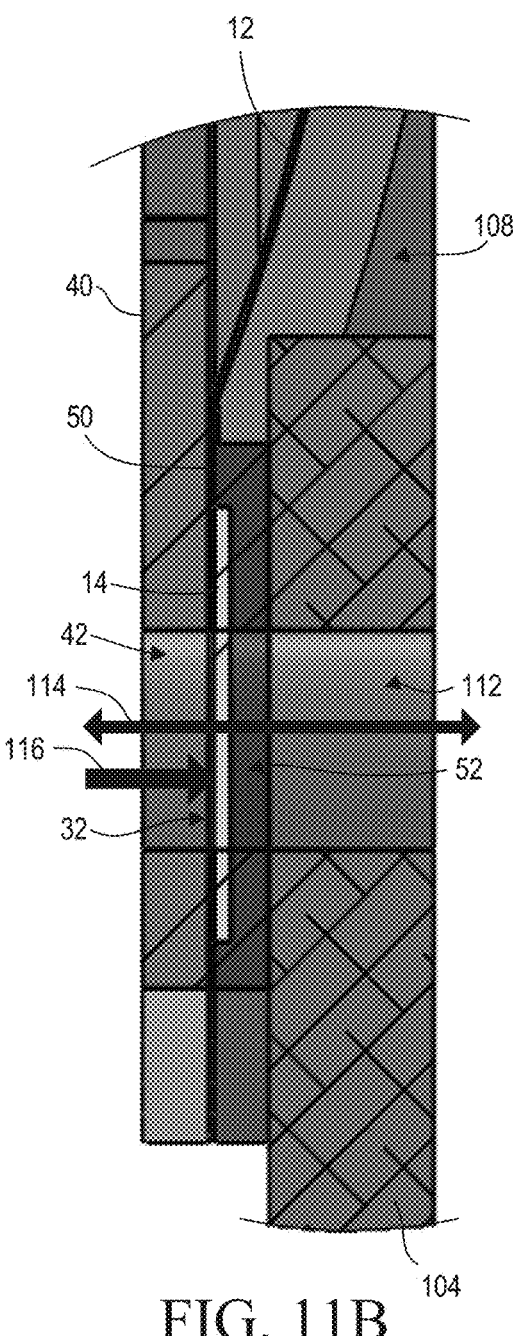
FIG. 11B is an enlarged view of the cross-section of FIG. 11A schematically depicting a breathable membrane permitting the ingress and egress of gas through the side wall of the battery housing, and inhibiting the ingress of dust and other small particles into the interior of the battery.
Figure 12:
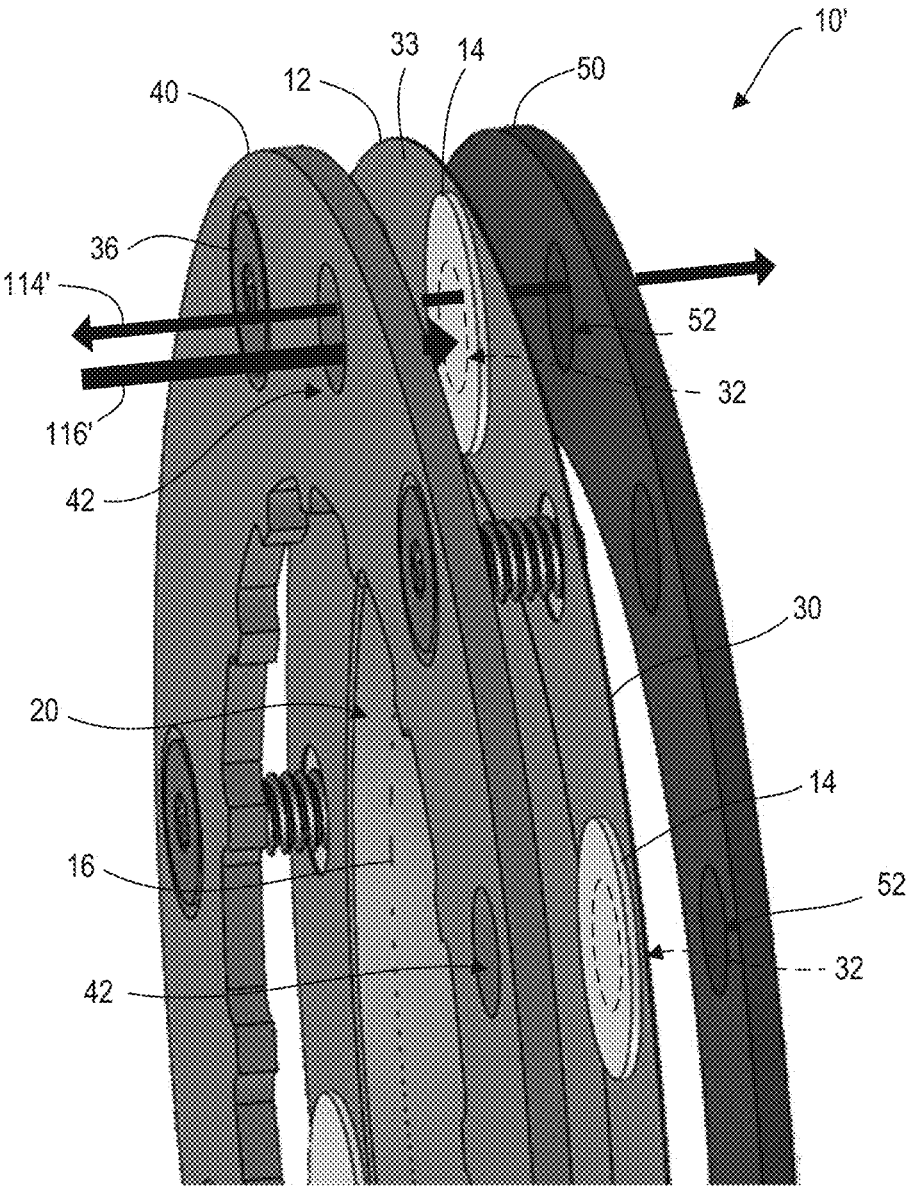
FIG. 12 is a partially exploded view of a second breathable overpressure assembly having a breathable membrane disposed on an outer surface of a rupture disc member between the rupture disc member and the outlet ring.

Referring to FIGS. 11A and 11B, the wall 104 of the sealed device 100 includes one or more vent openings 112, which may correspond in size, shape, and/or arrangement to one or more vent openings of the breathable rupture assembly 10. For example, and referring to FIG. 11B, in the installed configuration, the breathable rupture assembly 10 is arranged such that vent openings 42 of the outlet ring 40, vent openings 32 of the rupture disc 12, the breathable membranes 14, and vent openings 52 of the gasket 50 are preferably aligned to be coaxial with the vent openings 112 of the wall 104. The so installed breathable rupture assembly 10 permits air or other gases to flow into and out of the sealed device 100 (e.g., through vent openings 112 of the sealed device 100), as indicated at arrow 114, to regulate the internal pressure within the housing 102 relative to an external pressure outside of the housing 102. An increase in internal pressure of the sealed device 100 may be regulated through the breathable membranes 14 so that it approaches or reaches the external pressure. Furthermore, as discussed, the breathable membranes 14 are IP rated to inhibit passage of dust particles and moisture into the housing 102, as indicated at arrow 116.

Referring to FIG. 11A, a vent opening 32 and an edge 20A of the central rupture portion 20 of the rupture disc 12 may be spaced by a distance (D1 to D2) that is smaller than a diameter of the vent opening (D2 to D3). In one approach, the diameter of the vent opening 32 (D3 less D2) is less than the distance between the inner diameter of the vent opening and the radius of the central rupture portion 20 (D2 less D1). In another approach, the diameter of the vent opening 32 (D3 less D2) is greater than the distance between the inner diameter of the vent opening and the radius of the central rupture portion 20 (D2 less D1). In one example approach, D1 is approximately 0.70" from a central axis 12A of the rupture disc 12, D2 is approximately 0.80" from the central axis 12A, D3 is approximately 0.95" from the central axis 12A, and D4 is approximately 1.13" from the central axis 12A.

Referring to FIG. 12, a breathable overpressure assembly such as breathable rupture assembly 10' is provided that includes similar components as the breathable rupture assembly 10 shown in FIGS. 1-5 wherein components of the breathable rupture assembly 10' that are the same or similar to that of the previously-described breathable rupture assembly 10 will be provided with the same reference numeral. In the breathable rupture assembly 10' of FIG. 12, the breathable membranes 14 are secured (e.g., adhered) to the peripheral flange portion 30 of the rupture disc 12 at the outer surface 33 of the peripheral flange portion 30 of the rupture disc 12 such that the breathable membranes 14 entirely cover vent openings of the rupture disc 12, as discussed with respect to FIGS. 1-5. In this way, when the outlet ring 40 is fixedly secured to the outer surface 33 of the peripheral flange portion 30 at the concave side of the rupture disc 12 via welding (e.g., spot welding), mechanical fasteners, and/ or adhesive, the breathable membranes 14 are locked in place between the outlet ring 40 and the rupture disc 12. In this approach, the adhesive layer (e.g., adhesive layer 62 of FIGS. 6A and 6B) of the breathable membrane 14 acts to initially secure the breathable membrane 14 to the rupture disc 12, and the compressive forces between the outlet ring 40 and the rupture disc 12 upon securement of the outlet ring 40 to the rupture disc 12 permanently secures the breathable membranes 14 in place across vent openings 32, 42 of the rupture disc 12 and the outlet ring 40, respectively.

Similar to breathable rupture assembly 10, the breathable rupture assembly 10' permits air or other gases to flow into and out of a sealed device as indicated at arrow 114' to regulate pressure in the sealed device, while also inhibiting passage of dust particles and moisture into the sealed device, as indicated at arrow 116'. In this way, any gradual increase of pressure differential between an internal pressure of a sealed device (e.g., sealed device 100) and an external pressure may be avoided through the breathable membranes 14 of the breathable rupture assembly 10'.

The central rupture portion 20 includes a score such as a generally circular score 16 that may be similar to score 206 of rupture disc member 222 discussed with respect to FIGS. 20 and 21. In the event of a sudden increase in pressure differential between internal and external pressures, the central rupture portion 20 of the rupture disc 12 is configured to rupture along score 16. In this way, the internal and external pressures may be instantly equalized, thereby protecting internal components of the sealed device.

Figure 13:
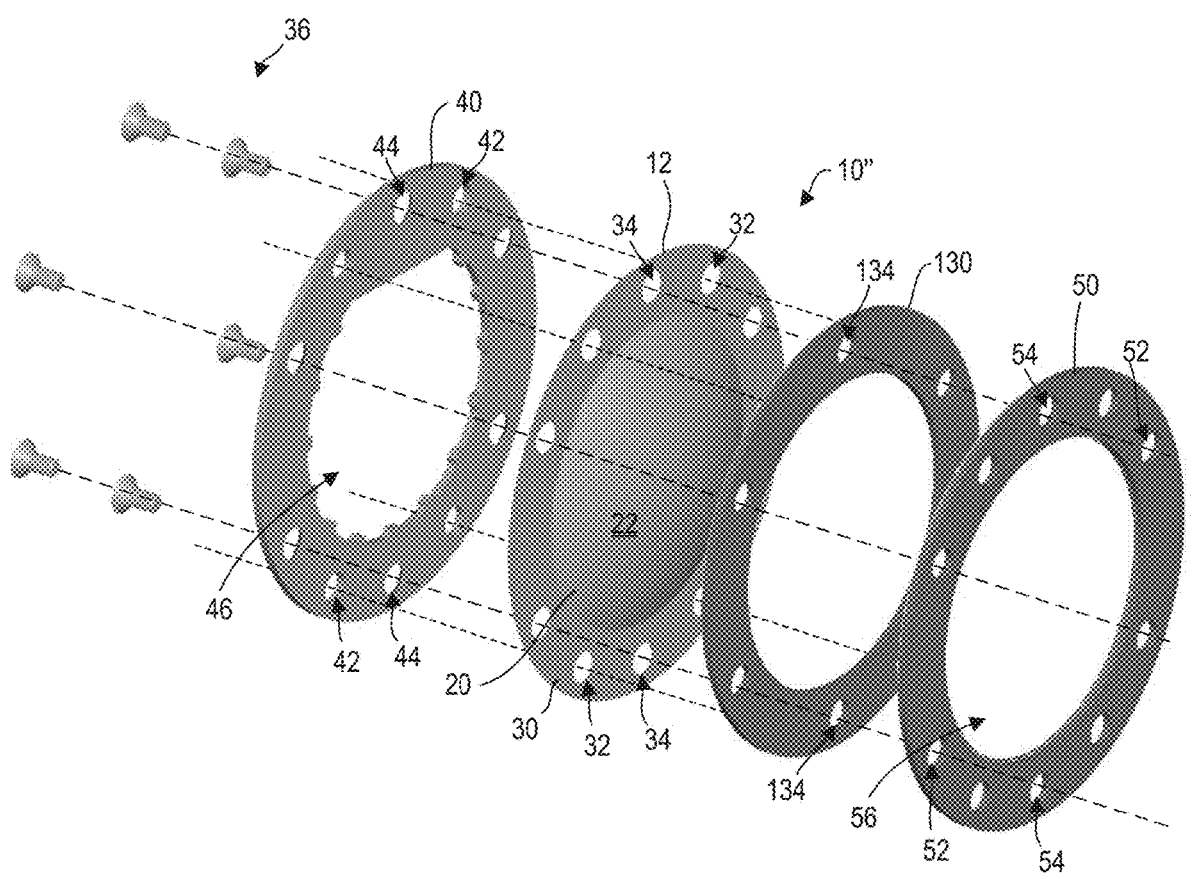
FIG. 13 is an exploded view of a third breathable overpressure assembly having a single annular breathable membrane that covers all the vent openings of the rupture disc member, outlet ring, and gasket, and having fastener openings that are aligned with fastener openings of the rupture disc member, outlet ring, and gasket.

Referring to FIG. 13, a breathable overpressure assembly such as breathable rupture assembly 10" is provided that includes similar components as the breathable rupture assembly 10 shown in FIGS. 1-5 wherein components of the breathable rupture assembly 10" that are the same or similar to that of the previously described breathable rupture assemblies 10, 10' will be provided with the same reference numeral. The breathable rupture assembly 10" of FIG. 13 includes an annular breathable membrane 130 in place of (or in addition to) breathable membranes 14. The material of the annular breathable membrane 130 may be the same as that of membrane layer 60 so that it may have properties similar to those discussed with respect to membrane layer 60 of FIGS. 6A and 6B. In this regard, the annular breathable membrane 130 permits air or other gases to flow into and out of a sealed device to regulate pressure in the sealed device, while also inhibiting passage of dust and other small particles and moisture into the sealed device. The annular breathable membrane 130 includes fastener openings 134 that are aligned with fastener openings 34, 44, and 54 of the rupture disc 12, outlet ring 40, and gasket 50, respectively, and have sufficient clearance to permit threaded shanks of the fasteners 36 to pass therethrough. The annular breathable membrane 130 may include an adhesive layer (e.g., adhesive layer 62 of FIGS. 6A and 6B) for securing the annular breathable membrane 130 to the rupture disc 12. In the approach shown, the annular breathable membrane 130 is secured between the rupture disc 12 and the gasket 50. In another approach, the annular breathable membrane 130 is secured between the rupture disc 12 and the outlet ring 40, similar to the breathable membrane 14 of FIG. 12. In still another approach, a first annular breathable membrane 130 is disposed between the rupture disc 12 and the gasket 50, and a second annular breathable membrane 130 is secured between the rupture disc 12 and the outlet ring 40.

Figures 14, 15, 16:
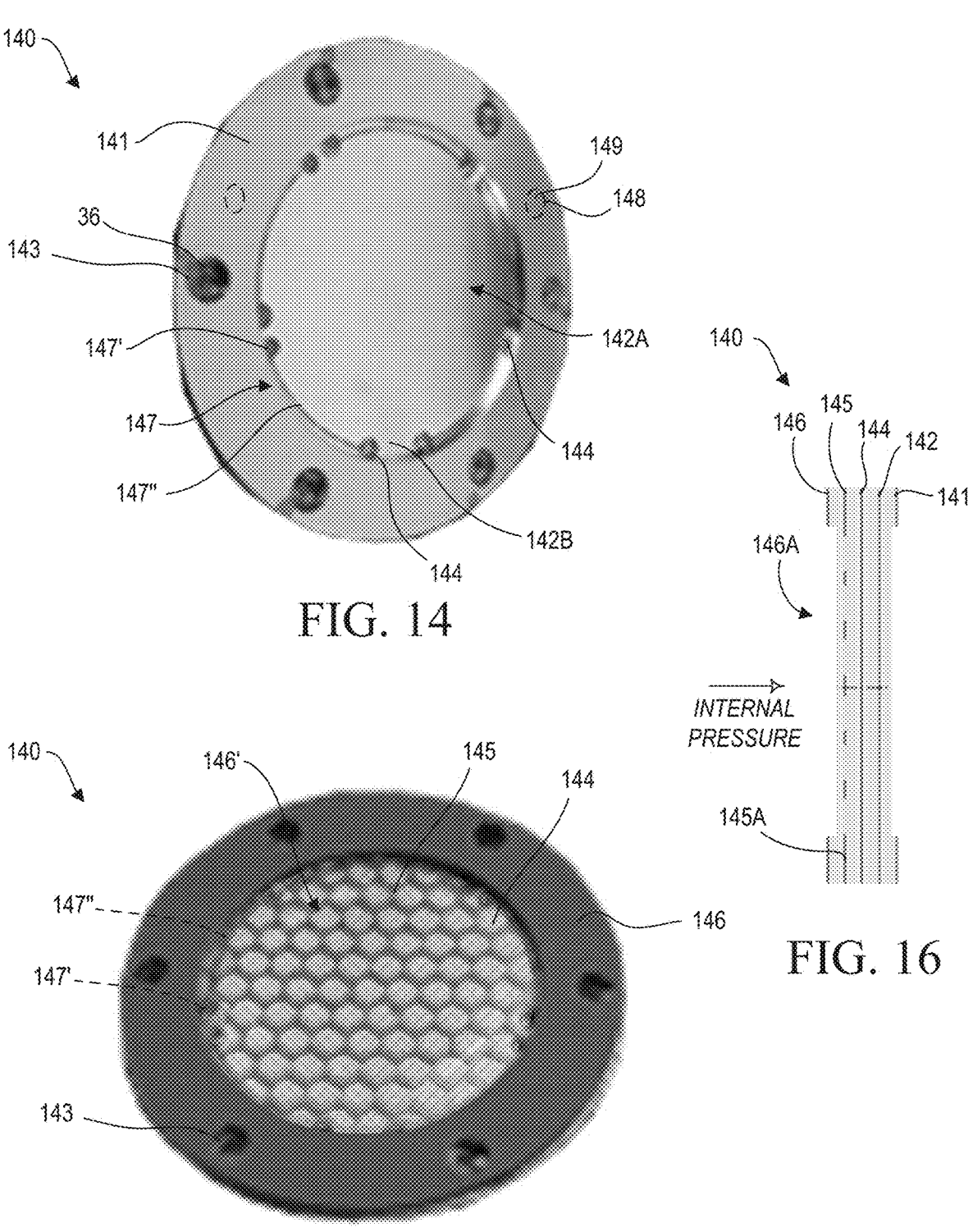
FIG. 14 is a front perspective view of a fourth breathable overpressure assembly showing vents extending through a central rupture portion of a rupture disc member.
FIG. 15 is a rear perspective view of the fourth breathable overpressure assembly of FIG. 14 showing a breathable membrane covering the vents of the central rupture portion of the rupture disc member, and a mesh back plate that provides support for the central rupture portion.
FIG. 16 is a schematic exploded side elevation view of the fourth breathable overpressure assembly of FIGS. 14 and 15 showing the outer mounting ring, rupture disc member, breathable membrane, mesh back plate, and inner gasket.

Referring to FIGS. 14-16, a breathable overpressure device such as breathable rupture assembly 140 is provided that includes similar components as the breathable overpressure assemblies 10, 10', 10" described herein. The breathable rupture assembly 140 can be a generally circular assembly and includes a rupture disc 142 having a central rupture portion 142A and a mounting ring 141. The central rupture portion 142A is configured to rupture at a predetermine rupture pressure at an interior container side of the breathable rupture assembly 140. The mounting ring 141 is a metal ring and includes fastener openings 143 that are sized to receive fasteners 36 therethrough for securing the breathable rupture assembly 140 to a vessel, as previously discussed.

The breathable rupture assembly 140 also includes one or more vents 147. The vents 147 are formed in the central rupture portion 142A radially inward from the mounting ring 141, and extend through the entire thickness of the rupture disc 142. The vents 147 may be in the form of through openings or apertures 147' and/or through slots 147". In the approach shown, the rupture disc 142 includes arcuate through slots 147" that each extend between a pair of through apertures 147'.

The vents 147 also function as preformed weaknesses or frangible portions of the central rupture portion 142A along which the rupture disc 142 breaks or ruptures at the predetermined rupture pressure. For example, the through apertures 147' and through slots 147" may form frangible portions including fault regions and lines at which the rupture disc 142 is intended to rupture. A rupture pressure threshold may be, for example, approximately 4 psi, 5 psi, 15 psi, or 100 psi. The rupture disc 142 may also include a hinge portion 142B about which the central rupture portion 142A is intended to fold or bend during a rupture event. The hinge portion 142B may be formed by providing a greater distance between adjacent vents 147 as compared to other adjacent vents 147 of the rupture disc 142. Upon a rupture event, the central rupture portion 142A becomes detached along the vents 147, but remains connected at the hinge portion 142B.

As shown in FIGS. 15 and 16, the breathable rupture assembly 140 also includes a breathable membrane 144. In the approach shown, the breathable membrane 144 is a disc-shaped membrane that extends across substantially the entire breathable rupture assembly 140 (e.g., across the mounting ring 141 and the rupture disc 142) adjacent to the rupture disc 142. The breathable membrane 144 is formed of an air-permeable material that facilitates the ingress and egress of gases, and regulates steady state pressure within a sealed enclosure. The breathable membrane 144 may be formed, for example, of polytetrafluoroethylene (PTFE), polyethylene (PE), or ultra-high-molecular-weight polyethylene (UHMWPE, UHMW). The breathable membrane 144 also has an Ingress Protection (IP) rating sufficient to inhibit passage of dust and other small particles and moisture therethrough (e.g., IP 64, IP 67, or IP 68). The breathable membrane 144 may also have corrosion resistance properties (e.g., as described in ASTM B117-11).

The breathable membrane 144 covers the vents 147 including the through apertures 147' and through slots 147". In this way, when the breathable rupture assembly 140 is installed on a sealed enclosure, the breathable membrane 144 regulates the difference in pressure inside a sealed enclosure relative to its immediate environment, while inhibiting contaminants and moisture from entering the sealed enclosure through the vents 147.

The breathable rupture assembly 140 also includes a back plate 145. In the approach shown, the back plate 145 is a mesh back plate that extends across substantially the entire breathable rupture assembly 140, and specifically across the mounting ring 141 and the rupture disc 142 including the central rupture portion 142A thereof. The back plate 145 provides support for the central rupture portion 142A to the central rupture portion 142A from activating and rupturing in the reverse or "backward" direction which is in the direction opposite "INTERNAL PRESSURE" arrow in FIG. 16. For example, the back plate 145 provides vacuum support for the central rupture portion 142A such that when the rupture disc 142 experiences a vacuum force from within a sealed enclosure, the back plate 145 keeps the rupture disc 142 from rupturing in the reverse direction. The back plate 145 also provides resistance against forces external to the sealed enclosure acting in the direction opposite "INTERNAL PRESSURE" arrow in FIG. 16 that may otherwise cause the rupture disc 142 to activate in the reverse direction.

The breathable rupture assembly 140 may also include a gasket 146. The gasket 146 may be formed of a compressible resilient material such as silicone. The gasket 146 forms a fluid-tight or substantially fluid-tight seal between the rupture disc 142 and a sealed enclosure (e.g., battery case 102 of FIG. 7) when the breathable rupture assembly 140 is installed on the sealed enclosure. The gasket 146 may be an annular gasket that includes a large central opening 146A so that it engages with a peripheral portion 145A of the back plate 145 when the breathable rupture assembly 140 is fastened to the sealed enclosure.

In another approach, the breathable rupture assembly 140 includes through openings 148 in the mounting ring 141 and one or more breathable membranes 149 aligned with the vents or openings, similar to those discussed with respect to breathable overpressure assemblies 10, 10', 10". The openings 148 and breathable membranes 149 may be provided in addition to, or instead of, vents 147 and breathable membranes 144.

Referring to FIG. 17-23, breathable overpressure assemblies such as breathable explosion vent assemblies 150, 150', 150" are shown. The breathable overpressure assemblies 150, 150', 150" may include similar components as the breathable overpressure assemblies 10, 10', 10", 140 described herein. For example, one or more of the breathable overpressure assemblies 150, 150', 150" may include a gasket that extends around a peripheral flange portion to form a fluid-tight or substantially fluid-tight seal between the assembly and a sealed vessel.

The breathable explosion vent assemblies 150, 150', 150" may be provided on sealed spaces that contain electrical devices that have the potential for an explosion. Explosions may be caused, for example, by an electric arc initiated by damage or failure of the device or circuitry. Example sealed spaces include power converters (e.g., direct current (DC) power converters), batteries (e.g., lithium-ion batteries), and other electrical boxes. During an explosion event, a rapid rise in pressure occurs in the containing structure. The breathable explosion vent assemblies 150, 150', 150" may provide controlled pressure release for sealed spaces where the possibility for explosion exists. The breathable explosion vent assemblies 150, 150', 150" may have a suitable shape (e.g., circular, rectangular, square), and may be flat or domed.

Referring to FIG. 17, a breathable explosion vent assembly 150 is provided that may include similar components as the breathable overpressure assemblies 10, 10', 10", 140 described herein. The illustrated breathable explosion vent assembly 150 is generally rectangular and includes a rupture member in the form of a rupture panel member 152 that is configured to rupture at a predetermined rupture pressure at an interior container side of the rupture panel member 152. The rupture panel member 152 may be formed, for example, of stainless steel, hastelloy, Inconel, nickel, graphite, or other suitable material. In one approach, the rupture panel member 152 is a generally flat or planar configuration. In another approach, the rupture panel member 152 includes a bulged rupture region. The rupture panel member 152 may include a frangible portion or portions that are preformed weaknesses, such as scores, perforations, or cut lines 154, in a surface of the rupture panel member 152 to form fault lines along which the rupture panel member 152 is intended to rupture. Cut lines 154 may be laser cut through the rupture panel member 152. A rupture pressure threshold may be, for example, approximately 4 psi, 5 psi, 15 psi, or 100 psi. The rupture panel member 152 may also include a hinge portion 152A about which a central portion 152B of the rupture panel member 152 is intended to fold or bend during an explosion event. The hinge portion 152A may be formed by providing a greater distance between adjacent cut lines 154 as compared to other adjacent cut lines 154 of the rupture panel member 152. Upon an explosion event, the central portion 152B of the rupture panel member 152 becomes detached along the cut lines 154, but remains connected to the remained of the rupture panel member 152 at the hinge portion 152A.

The breathable explosion vent assembly 150 also includes a rectangular peripheral flange portion 156 that has through openings that extend through the entire thickness of the peripheral flange portion 156. More particularly, the peripheral flange portion 156 includes one or more vent openings 160 and one or more fastener openings 162. The fastener openings 162 are sized to receive fasteners (e.g., fasteners 36 of FIG. 5) therethrough, as previously discussed. The breathable explosion vent assembly 150 also includes one or more breathable membranes 164 that are secured to the peripheral flange portion 156 in like or similar fashion as discussed with respect to breathable overpressure assemblies 10, 10', 10".

The breathable explosion vent assembly 150 may also include a gasket 166. The gasket 158 may be formed of a compressible resilient material such as silicone. Similar to gaskets 50, 146 discussed herein, the gasket 166 extends along the outer peripheral flange portion 156 and forms a fluid-tight or substantially fluid-tight seal between the outer peripheral flange portion 156 and the sealed enclosure when the breathable explosion vent assembly 150 is installed on the sealed enclosure.

Referring to FIGS. 18 and 19, a breathable explosion vent assembly 150' is provided that includes similar components as the breathable overpressure assemblies 10, 10', 10", 140, 150 described herein. The breathable explosion vent assembly 150' has a generally square configuration and includes a rupture member in the form of a rupture panel member 172 that is configured to rupture at a predetermine rupture pressure at an interior container side of the rupture panel member 172. As shown in FIG. 19, the breathable explosion vent assembly 150' may have a bulged or domed rupturable portion 174 that extends outwardly relative to a sealed enclosure. As shown by the "INTERNAL PRESSURE" arrow, increases in pressure within the sealed enclosure act on the concave wall 174A of the domed rupturable portion 174. In this way, the breathable explosion vent assembly 150' may be a forward-acting (tension loaded) rupture assembly.

Similar to the previously discussed breathable overpressure assemblies, breathable explosion vent assembly 150' includes a square peripheral flange portion 176 extending about the central domed rupturable portion 174 that has through openings that extend through the entire thickness of the peripheral flange 176. More particularly, the peripheral flange 176 includes one or more vent openings 180 and one or more fastener openings 182. The fastener openings 182 are sized to receive fasteners (e.g., fasteners 36) therethrough, as previously discussed. The breathable explosion vent assembly 150' also includes one or more breathable membranes 184 that are secured to the peripheral flange 176 to extend over and cover the vent openings 180 in like or similar fashion as discussed with respect to the breathable overpressure assemblies previously described herein.

Referring to FIGS. 20 and 21, a breathable overpressure assembly such as breathable explosion vent assembly 150" is provided that includes similar components as the breathable overpressure assemblies 10, 10', 10", 140, 150, 150' described herein. As shown in FIG. 20, the breathable explosion vent assembly 150" has a generally circular configuration. As shown in FIG. 21, the breathable explosion vent assembly 150" may have a bulged or domed rupturable portion 204 that extends outwardly relative to a sealed container. In this way, the breathable explosion vent assembly 150" may be a forward-acting (tension loaded) rupture assembly.

Similar to the previously discussed breathable overpressure assemblies, breathable explosion vent assembly 150" includes a peripheral flange portion 208 that has through openings that extend through the entire thickness of the peripheral flange portion 208. More particularly, the through openings of the peripheral flange portion 208 can include one or more vent openings 210 and one or more fastener openings 212. The vent openings 210 and fastener openings 212 may alternate about the circumference of the peripheral flange portion 208. The fastener openings 212 are sized to receive fasteners (e.g., fasteners 36) therethrough, as previously discussed. The breathable explosion vent assembly 150" also includes one or more breathable membranes 214 that are secured to the peripheral flange portion 208 to cover the vent openings 210 in like or similar fashion as discussed with respect to the breathable overpressure assemblies previously described herein.

As shown in FIG. 21, the breathable explosion vent assembly 150" may be a composite assembly that includes a stack of layers, as described below. The layers cooperate to form the domed rupturable portion 204 and the peripheral flange portion 208.

The layers of the breathable explosion vent assembly 150" include an outer domed rupture disc member 222 that has a peripheral flange portion 208A and a central rupture portion 222A that is configured to rupture at a predetermined rupture pressure at an interior container side of the rupture disc member 222, as previously discussed. The rupture disc member 222 may be formed, for example, of 316 stainless steel. The rupture disc member 222 may include a frangible portion such as score 206 in the central rupture portion 222A to form a fault line along which the rupture disc member 222 is intended to rupture. Score 206 may be laser cut all the way through the rupture disc member 222. In the illustrated approach, the score 206 is a generally circular score 206 that is disposed inwardly and spaced from the edge of the peripheral flange portion 208A. The score 206 does not extend entirely around the central rupture portion 222A such that where the score 206 is not formed in the rupture disc member 222, the central rupture portion 222A forms a hinge portion 222B about which an inner portion 222C of the central rupture portion 222A is intended to fold during a rupture event.

The score 206 may include a plurality of arcuate score segments 206A that each extend between score ends 206B, 206C and form unscored segments 222D of the central rupture portion 222A between respective pairs of score ends 206B, 206C. A predetermined rupture pressure may be a controlled by varying the distance between score ends 206B, 206C. For example, a rupture disc member 222 having a shorter distance between score ends 206B, 206C, and thus shorter unscored segments 222D, may have a lower predetermined rupture pressure than a rupture disc member 222 having a longer distance between score ends 206B, 206C and having longer unscored segments 222D. A predetermined rupture pressure may also be controlled by increasing or decreasing the thickness of the material of the rupture disc member 222, and more particularly, the thickness of the central rupture portion 222A. A predetermined rupture pressure may also be controlled by increasing or decreasing the distance between score ends 206B, 206C adjacent the hinge portion 222B. Upon a rupture event, the inner portion 222C of the central rupture portion 222A becomes detached at the unscored segments 222D and folds about the hinge portion 222B, but remains connected to the central rupture portion 222A at the hinge portion 222B.

The breathable explosion vent assembly 150″ further includes an inner metallic backing support member 226 that may be formed of 316 stainless steel. The backing support member 226 includes a frangible portion such as score 207A, which may be laser cut all the way through the backing support member 226. Score 207A has generally the same configuration as the score 206 of the rupture member 222 (e.g., generally circular) and is aligned with score 206 in the assembled form of the breathable explosion vent assembly 150″. Whereas score 206 may include unscored segments 222D, score 207A may be cut all the way from one end of the hinge around the backing support member 226 to the other end of the hinge so that it extends in an uninterrupted fashion except for the hinge 222B. The backing support member 226 may also have scores 207B that are not aligned with scores 206 (e.g., that extend across a face of the domed rupturable portion 204).

The backing support member 226 may further include clips 209 that are secured to an inner concave wall surface 226A of the backing support member 226. The clips 209 are welded or otherwise secured to the concave wall surface 226A such that each clip 209 extends across the score 207A. In the illustrated approach, the clips 209 are spot-welded 209A, as indicated at 209A, in alternating fashion. For example, a first clip 209 may be spot-welded 209A to the concave wall surface 226A at a radially inner side of the score 207A, and an adjacent second clip 209 may be spot-welded 209A to the concave wall surface 226A at a radially outer side of the score 207A. The illustrated clips 209 have a hexagonal configuration, although other configurations such as rectangular are possible.

The clips 209 cause the composite breathable explosion vent assembly 150″ to operate in a forward-acting direction such that the breathable explosion vent assembly 150″ ruptures in the direction indicated by the "INTERNAL PRESSURE" arrow in FIG. 21, but resists forces that would tend to cause the breathable explosion vent assembly 150″ to rupture in the reverse direction. More particularly, the clips 209 cause the backing support member 226 to resist vacuum forces against the concave side of the domed rupturable portion 204 and to resist compressive forces (e.g., external forces) against the convex side of the domed rupturable portion 204, but allow the backing support member 226 to rupture in the direction indicated by the "INTERNAL PRESSURE" arrow when the pressure differential between internal and external pressures of the sealed container reaches a predetermined bursting pressure.

The breathable explosion vent assembly 150″ further includes a sealing membrane 224 positioned between the rupture disc member 222 and the backing support 226. The sealing membrane 224 may be formed, for example, of Teflon or PTFE. The sealing membrane 224 protects against pressure losses through scores 206, 207A of the rupture member 222 and the backing support member 226, thereby sealing the opening 108 of the housing 102.

The breathable explosion vent assembly 150″ may also include one or more internal protective covers 220. The protective covers 220 may be formed, for example, of Teflon, PTFE, or aluminum, and may be in the form of slit-slot covers. The protective covers 220 are arranged on one or both of the inner and outer surfaces of the sealing membrane 224. For example, an inner protective cover 220 may be arranged between the metal backing support 226 and the sealing membrane 224, and an outer protective cover 220 may be arranged between the rupture disc member 222 and the sealing membrane 224. In this way, the protective covers 220 prevent the sealing membrane 224 from being damaged by burrs or sharp edges of the metal backing support 226 and the rupture disc member 222 such as caused by formation of the score 206 in the rupture disc member 222. The protective covers 220 may also include cut lines or scores, as discussed in greater detail below.

In one approach, the sealing membrane 224 and the metal backing support 226 have a predetermined forward-acting bursting pressure that is less than the predetermined bursting pressure of the rupture disc member 222. For example, the rupture disc member 222 may have a predetermined bursting pressure of approximately 6 psi, and rupture disc member 222, and the sealing membrane 224 and the metal backing support 226 may each have a bursting pressure less than 4 psi.

Referring to FIGS. 22 and 23, a breathable overpressure assembly such as breathable explosion vent assembly 150‴ is provided that includes similar components as the breathable overpressure assemblies 10, 10′, 10″, 140, 150′, and 150″ described herein. As shown in FIG. 22, the breathable explosion vent assembly 150‴ has a generally circular configuration. As shown in FIG. 23, the breathable explosion vent assembly 150‴ may be generally planar.

Similar to the previously discussed breathable overpressure assemblies, breathable explosion vent assembly 150‴ includes a peripheral flange portion 258 that has through openings that extend through the entire thickness of the peripheral flange portion 258. More particularly, the peripheral flange portion 258 includes one or more vent openings 260 and one or more fastener openings 262. The vent openings 260 and fastener openings 262 may alternate about the circumference of the peripheral flange portion 258. The fastener openings 262 are sized to receive fasteners (e.g., fasteners 36) therethrough, as previously discussed. The breathable explosion vent assembly 150‴ also includes one or more breathable membranes 264 that are secured to the peripheral flange portion 258 to cover the vent openings 260 in like or similar fashion as discussed with respect to the breathable overpressure assemblies previously described herein.

As shown in FIG. 23, the breathable explosion vent assembly 150‴ may include a stack of layers that cooperate to form a central rupture portion 252 and the peripheral portion 258. The layers of the breathable explosion vent assembly 150‴ may be the same materials as discussed with respect to the layers of breathable explosion vent assembly 150″; for example, a rupture disc member 272, an inner metallic backing support 276, a sealing membrane 274, and one or more protective covers 270.

In the illustrated approach, the rupture disc member 272 may include one or more frangible portions, such as scores 256, in a central rupture portion 272A of the rupture disc member 272 to form fault lines along which the rupture disc member 272 is intended to rupture. Scores 256 may be laser cut through the entire rupture disc member 272. The scores 256 may be radially extending scores that extend between the peripheral portion 258 and the center 272B of the central rupture portion 272A without passing through the center 272B. A predetermined rupture pressure at which the disc member 272 is rated to rupture may be adjusted by increasing or decreasing the distance between radially inner ends 256A, 256B of the scores 256 at the center 272B of the central rupture portion 272A. For example, a greater rupture pressure may be achieved by increasing the distance between opposing radially inner ends 256A, 256B of the scores 256, and a lesser rupture pressure may be achieved by decreasing the distance between opposing radially inner ends 256A, 256B of the scores 256. The scores 256 facilitate rupturing of the central rupture portion 272A such that upon rupture, the central rupture portion 272A forms generally triangular-shaped petal portions 272C having edges predetermined by the scores 256. The petal portions 272C are retained by the rupture disc member 272 at hinge portions 272D radially inward of the peripheral flange portion 258.

The protective covers 270 may also include cut lines or scores 270A. The scores 270A may extend across the center 272B of the central rupture portion 272A of the rupture disc member 272. The scores 270A may be angularly offset ("clocked") relative to the scores 256 of the rupture disc member 272. In this way, petals 270B formed between adjacent scores 270A are arranged between the scores 256 and the sealing membrane 274 to protect the sealing membrane 274 from any sharp edges formed by the scores 256 in the rupture disc member 272.

As described, the breathable overpressure assemblies 10, 10', 10", 140, 150, 150', 150", 150''' provide both ventilation and pressure relief for sealed vessels or systems in a compact, integrated manner. The breathable overpressure assemblies 10, 10', 10", 140, 150, 150', 150", 150''' also allow for customization of the shape, size, quantity, and arrangement of the vent openings and breathable membranes to address various ventilation needs. The integration of the ventilation and pressure relief capabilities also provides several advantages. For example, the integrated breathable overpressure assemblies 10, 10', 10', 140, 150, 150', 150", 150''' may reduce installation time as compared to installation time required to install separate rupture discs and vents on a sealed assembly. Furthermore, the integrated breathable overpressure assemblies 10, 10', 10", 140, 150, 150', 150", 150''' may provide a weight reduction for a sealed assembly as compared to a sealed assembly having both a rupture disc and standalone vent. Still further, the breathable overpressure assemblies 10, 10', 10", 140, 150, 150', 150", 150''' allow for the elimination of a dedicated vent and therefore increase available packaging space for other components of the sealed vessels. Elimination of a dedicated vent may also reduce the height or width of a sealed vessel.

Furthermore, in many applications, exhaust hoses are connected to a sealed vessel at egresses (e.g., vents and rupture discs) of the sealed vessel to direct gases released through the egresses to a desired location. For example, a sealed battery such as a lithium-ion battery may be installed in a vehicle or aircraft. An exhaust hose may be connected to the battery at the vent to direct vented gases to the outside atmosphere. Similarly, an exhaust hose may be connected to the battery at the rupture disc to direct gases expelled during a rupture event to the outside atmosphere. In this way, the exhaust hoses prevent potentially harmful exhaust gases expelled from the battery from reaching the cabin of the vehicle. A sealed vessel that has a rupture disc and a standalone vent has two potential egresses for gases to escape from the sealed vessel. As such, to simultaneously control and disperse gases from the two egresses, two exhaust hoses or similar devices may be required.

Figure 7:
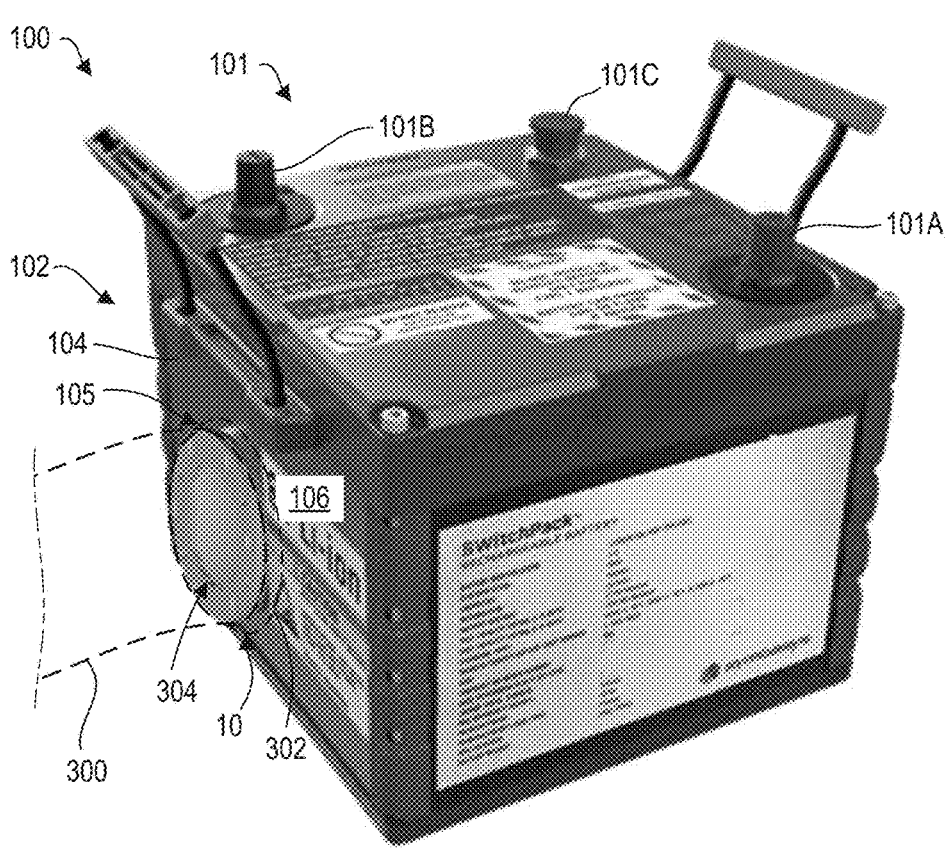
FIG. 7 is a perspective view of a battery having the breathable overpressure assembly of FIG. 1 secured to a side wall of a battery housing with the battery vented through the breathable membranes of the breathable overpressure assembly.
Figure 8:
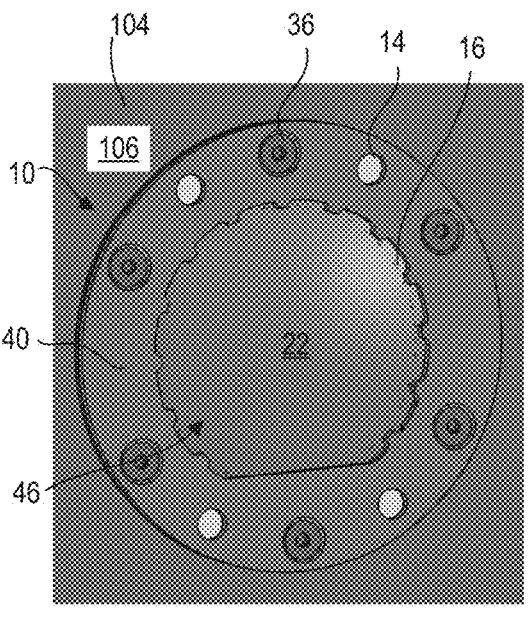
FIG. 8 is an outside view of the breathable overpressure assembly installed on the battery of FIG. 7 showing the breathable membranes covering the vent openings of the outlet ring and the concave surface of the rupture disc member of the breathable overpressure assembly.
Figure 9:
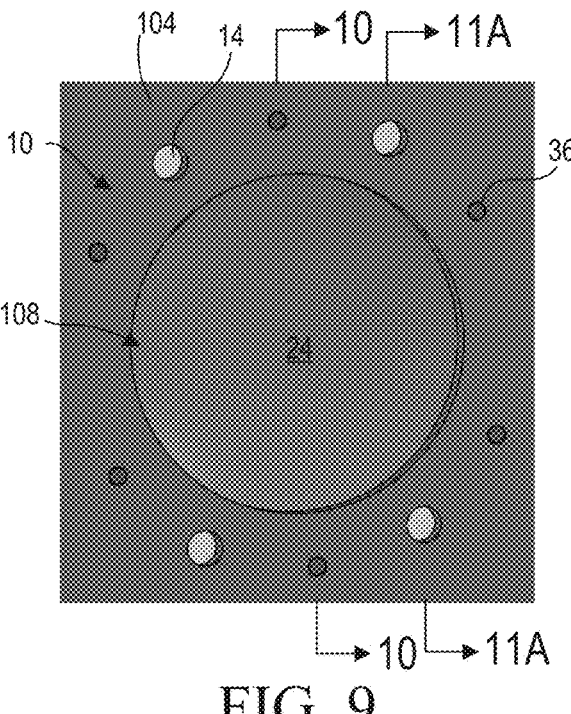
FIG. 9 is an inside view of the breathable overpressure assembly installed on the battery showing breathable membranes covering vent openings through the side wall of the battery housing.

In contrast, the integrated breathable overpressure assemblies 10, 10', 10", 140, 150, 150', 150", 150''' discussed herein provide one general location for vented or rupturing gases to escape. In this way, as shown in FIG. 7 a single exhaust hose 300 may be used to control and disperse gases from a single egress, thereby reducing installation time and simplifying ventilation systems. For example, the exhaust hose 300 may have a fitting 302, which includes mounting a flange, and an opening 304 that are sized to fit over both the central rupture portion 20 and the vent openings 32, 42, 52 of an integrated breathable overpressure assembly 10, 10', 10", 140, 150, 150', 150", 150'''. The exhaust hose 300 is therefore able to receive both rupture gases through the central rupture portion 20 and vented gases through the vent openings 32, 42, 52 and breathable membranes 14 and can direct the gases from the interior of the housing to an exterior of an enclosure (such as an aircraft or vehicle) in which the housing is disposed.

While there have been illustrated and described particular embodiments of the present invention, those skilled in the art will recognize that a wide variety of modifications, alterations, and combinations can be made with respect to the above-described embodiments without departing from the scope of the invention, and it is intended for the present invention to cover all those changes and modifications which fall within the scope of the appended claims.

What is claimed is:

1. A breathable overpressure assembly for being mounted over an opening in a sealed container, the breathable overpressure assembly comprising:

a rupture member including a central rupture portion and a peripheral flange extending about at least a portion of the central rupture portion, the central rupture portion sized to cover the opening in the sealed container and configured to rupture at a predetermined pressure at an interior container side of the rupture member;

at least one vent opening extending through at least one of the central rupture portion and the peripheral flange; and a breathable membrane covering the at least one vent opening for allowing the passage of gas through the at least one of the central rupture portion and the peripheral flange via the breathable membrane, wherein the at least one vent opening includes a plurality of vent openings, and the breathable membrane includes at least one breathable membrane that covers the plurality of vent openings.

2. The breathable overpressure assembly of claim 1 wherein the at least one vent opening extends through the peripheral flange, and the at least one vent opening and the central rupture portion are spaced by a distance that is approximately equal to or less than a diameter of the vent opening.

3. A breathable overpressure assembly for being mounted over an opening in a sealed container, the breathable overpressure assembly comprising:

a rupture member including a central rupture portion and a peripheral flange extending about at least a portion of the central rupture portion, the central rupture portion sized to cover the opening in the sealed container and configured to rupture at a predetermined pressure at an interior container side of the rupture member;

at least one vent opening extending through at least one of the central rupture portion and the peripheral flange; and a breathable membrane covering the at least one vent opening for allowing the passage of gas through the at least one of the central rupture portion and the peripheral flange via the breathable membrane, wherein the at least one vent opening is in the peripheral flange and includes a plurality of vent openings, and the peripheral flange includes at least one fastener opening disposed between a pair of the vent openings for receiving a fastener therethrough.

4. The breathable overpressure assembly of claim 1 further comprising a mounting ring having a plurality of countersunk fastener openings configured for receiving heads of fasteners and the plurality of vent openings have configurations different than the fastener openings.

5. The breathable overpressure assembly of claim 4 wherein the countersunk fastener openings have a smallest diameter and the vent openings of the rupture member have a constant diameter substantially the same as the smallest diameter.

6. The breathable overpressure assembly of claim 5 wherein the fastener openings and the vent openings of the rupture member each have a constant diameter that is the same as smallest diameter of the countersunk fastener openings and the constant diameter of the vent openings of the rupture member.

7. The breathable overpressure assembly of claim 1 wherein the peripheral flange includes a plurality of fastener openings extending therethrough for receiving respective fasteners, and the plurality of vent openings includes at least one vent opening in the peripheral flange and disposed between a pair of the fastener openings.

8. The breathable overpressure assembly of claim 1 wherein the plurality of vent openings including a first vent opening extending through the peripheral flange and a second vent opening extending through the central rupture portion.

9. The breathable overpressure assembly of claim 1 wherein the breathable membrane includes a plurality of breathable membranes with each breathable membrane including a membrane layer and an adhesive layer, the adhesive layer extending over a covered portion of the membrane layer such that the membrane layer includes an exposed membrane layer portion free of the adhesive layer thereon.

10. The breathable overpressure assembly of claim 9 wherein the adhesive layer of each of the plurality of breathable membranes is adhesively secured to the rupture member such that the adhesive layers extend about the plurality of vent openings, and the exposed membrane layer portions cover the at least one plurality of vent openings.

11. The breathable overpressure assembly of claim 1 further comprising an outlet ring sealed to an outer surface of the rupture member facing away from the sealed container for mounting the rupture member to the sealed container, the outlet ring and the peripheral flange including generally aligned fastener openings for receiving fasteners therethrough to secure the outlet ring of the rupture member to the sealed container, and the outlet ring including at least one outlet vent opening generally aligned with the at least one vent opening of the plurality of vent openings of the rupture member.

12. The breathable overpressure assembly of claim 11 wherein the breathable membrane is disposed between the rupture member and the outlet ring.

13. The breathable overpressure assembly of claim 1 further comprising a gasket disposed between the rupture member and the sealed container for sealing the rupture member to the sealed container, the gasket including at least one gasket vent opening generally aligned with the at least one vent opening of the plurality of vent openings of the rupture member.

14. The breathable overpressure assembly of claim 13 wherein the breathable membrane is between the rupture member and the gasket with the rupture member sealed to the sealed container.

15. The breathable overpressure assembly of claim 1 wherein the breathable membrane is an annular breathable membrane that extends annularly about the central rupture portion of the rupture member.

16. The breathable overpressure assembly of claim 15 wherein the annular breathable membrane includes fastener openings that are generally aligned with fastener openings of the rupture member.

17. The breathable overpressure assembly of claim 1 wherein the central rupture portion is a central domed portion having opposing concave and convex faces.

18. A breathable overpressure assembly for being mounted over an opening in a sealed container, the breathable overpressure assembly comprising:

a rupture member including a central rupture portion and a peripheral flange extending about at least a portion of the central rupture portion, the central rupture portion sized to cover the opening in the sealed container and configured to rupture at a predetermined pressure at an interior container side of the rupture member;

at least one vent opening extending through at least one of the central rupture portion and the peripheral flange; and a breathable membrane covering the at least one vent opening for allowing the passage of gas through the at least one of the central rupture portion and the peripheral flange via the breathable membrane; and a gasket having a plurality of fastener openings and a plurality of vent openings extending therethrough, wherein the at least vent opening of the at least one of the central rupture portion and the peripheral flange comprises a plurality of vent openings of the rupture member, the rupture member includes a plurality of fastener openings, and the plurality of fastener openings of the gasket are generally aligned with the plurality of fastener openings of the rupture member, and the plurality of vent openings of the gasket are generally aligned with the plurality of vent openings of the rupture member and the breathable membrane.

19. The breathable overpressure assembly of claim 1 wherein the breathable membrane is a disc-shaped membrane that extends across the central rupture portion and across the plurality of vent openings.

20. A breathable overpressure assembly for being mounted over an opening in a sealed container, the breathable overpressure assembly comprising:

a rupture member including a central rupture portion and a peripheral flange extending about at least a portion of the central rupture portion, the central rupture portion sized to cover the opening in the sealed container and configured to rupture at a predetermined pressure at an interior container side of the rupture member;

at least one vent opening extending through at least one of the central rupture portion and the peripheral flange; and a breathable membrane covering the at least one vent opening for allowing the passage of gas through the at least one of the central rupture portion and the peripheral flange via the breathable membrane, wherein the central rupture portion includes a frangible portion along which the central rupture portion ruptures, and the at least one vent opening includes a first vent opening and a second vent opening with the frangible portion extending therebetween.

21. The breathable overpressure assembly of claim 20 wherein the frangible portion is a score extending through the rupture member and wherein the breathable membrane is sized to cover the score and the first and second vent openings.

22. The breathable overpressure assembly of claim 1 wherein the rupture member includes scores therethrough, and a sealing membrane at a container-facing side of the rupture member for sealing the opening of the sealed container against pressure loss through the score, and a backing support member at a container-facing side of the sealing membrane for supporting the central rupture portion of the rupture member against vacuum forces from the interior of the sealed container.

23. The breathable overpressure assembly of claim 22 wherein the plurality of vent openings are in the peripheral flange, and the backing support member and the sealing membrane each include a plurality of vent openings that are generally aligned with the plurality of vent openings of the rupture member.

* * * * *